(12) United States Patent
Davis et al.

(10) Patent No.: US 8,774,757 B2
(45) Date of Patent: *Jul. 8, 2014

(54) SYSTEMS AND METHODS TO FACILITATE REPEATED PURCHASES

(71) Applicant: Boku, Inc., San Franciso, CA (US)

(72) Inventors: Kurt Davis, San Francisco, CA (US); Jang Kim, San Francisco, CA (US); David Yoo, San Mateo, CA (US); James Goodsall, Bollington (GB)

(73) Assignee: Boku, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/949,074

(22) Filed: Jul. 23, 2013

(65) Prior Publication Data

US 2013/0311377 A1 Nov. 21, 2013

Related U.S. Application Data

(63) Continuation of application No. 13/453,198, filed on Apr. 23, 2012, now Pat. No. 8,543,087.

(60) Provisional application No. 61/479,200, filed on Apr. 26, 2011.

(51) Int. Cl.
*H04M 11/00* (2006.01)

(52) U.S. Cl.
USPC ........ 455/407; 455/406; 455/466; 455/414.1; 455/415; 705/14.64

(58) Field of Classification Search
CPC .... H04M 2215/32; H04M 15/28; H04W 4/24
USPC ........ 455/407, 406, 466, 414, 415; 705/14.64
See application file for complete search history.

(56) References Cited

U.S. PATENT DOCUMENTS

| 5,283,829 A | 2/1994 | Anderson |
| 5,466,919 A | 11/1995 | Hovakimian |
| 5,663,547 A | 9/1997 | Ziarno |
| 5,708,422 A | 1/1998 | Blonder et al. |

(Continued)

FOREIGN PATENT DOCUMENTS

| GB | 2379525 | 3/2003 |
| JP | 2007109014 | 4/2007 |

(Continued)

OTHER PUBLICATIONS

"European Patent Application No. 09711520.8", Extended Search Report mailed Apr. 27, 2011.

(Continued)

*Primary Examiner* — Nghi H Ly
(74) *Attorney, Agent, or Firm* — Stephen M. De Klerk

(57) ABSTRACT

Systems and methods are provided to facilitate repeated purchase and payment transactions. In one aspect, a system includes an interchange and a data storage facility configured to store payment transaction records associated with phone numbers. The interchange includes a common format processor and a plurality of converters to interface with a plurality of different controllers of mobile communications. The converters are configured to communicate with the controllers in different formats and to communicate with the common format processor in a common format. The common format processor is configured to identify a prior payment transaction associated with a phone number in response to a message from a mobile phone having the phone number, communicate with a merchant to repeat a purchase according to the prior payment transaction, and transmit via one of the converters premium messages to the mobile phone to collect funds for a payment to repeat the purchase.

14 Claims, 21 Drawing Sheets

(56) References Cited

U.S. PATENT DOCUMENTS

| | | | |
|---|---|---|---|
| 5,845,260 A | 12/1998 | Nakano et al. | |
| 5,905,873 A | 5/1999 | Hartmann et al. | |
| 5,914,472 A | 6/1999 | Foladare et al. | |
| 5,945,653 A | 8/1999 | Walker et al. | |
| 5,953,710 A | 9/1999 | Fleming | |
| 6,227,447 B1 | 5/2001 | Campisano | |
| 6,282,276 B1 | 8/2001 | Felger | |
| 6,302,326 B1 | 10/2001 | Symonds et al. | |
| 6,473,808 B1 | 10/2002 | Yeivin et al. | |
| 6,612,488 B2 | 9/2003 | Suzuki | |
| 6,704,409 B1 | 3/2004 | Dilip et al. | |
| 6,718,178 B1 | 4/2004 | Sladek et al. | |
| 6,732,919 B2 | 5/2004 | Macklin et al. | |
| 6,736,322 B2 | 5/2004 | Gobburu et al. | |
| 6,788,771 B2 | 9/2004 | Manto | |
| 6,807,410 B1 | 10/2004 | Pailles et al. | |
| 6,928,558 B1 | 8/2005 | Allahwerdi et al. | |
| 6,965,872 B1 | 11/2005 | Grdina | |
| 6,996,409 B2 | 2/2006 | Gopinath et al. | |
| 6,999,943 B1* | 2/2006 | Johnson et al. | 705/39 |
| 7,013,125 B2 | 3/2006 | Henrikson | |
| 7,080,049 B2 | 7/2006 | Truitt et al. | |
| 7,089,208 B1 | 8/2006 | Levchin et al. | |
| 7,107,068 B2 | 9/2006 | Benzon et al. | |
| 7,174,301 B2 | 2/2007 | Florance et al. | |
| 7,221,951 B2 | 5/2007 | Anvekar et al. | |
| 7,257,388 B2* | 8/2007 | Bayne | 455/406 |
| 7,292,996 B2 | 11/2007 | Nobrega et al. | |
| 7,308,254 B1 | 12/2007 | Rissanen | |
| 7,315,541 B1 | 1/2008 | Housel et al. | |
| 7,331,518 B2 | 2/2008 | Rable | |
| 7,357,310 B2 | 4/2008 | Calabrese et al. | |
| 7,366,702 B2 | 4/2008 | David | |
| 7,374,079 B2 | 5/2008 | Nam et al. | |
| 7,386,477 B2 | 6/2008 | Fano | |
| 7,413,119 B2 | 8/2008 | Kubo et al. | |
| 7,437,331 B1 | 10/2008 | Rosenberger | |
| 7,458,507 B2 | 12/2008 | Fillinger et al. | |
| 7,478,055 B2 | 1/2009 | Goino | |
| 7,487,114 B2 | 2/2009 | Florance et al. | |
| 7,527,192 B1 | 5/2009 | Chaskin et al. | |
| 7,546,266 B2 | 6/2009 | Beirne et al. | |
| 7,558,777 B1 | 7/2009 | Santos | |
| 7,660,772 B2 | 2/2010 | Verkama | |
| 7,734,543 B2 | 6/2010 | Braco | |
| 7,748,614 B2 | 7/2010 | Brown | |
| 7,752,135 B2 | 7/2010 | Brown et al. | |
| 7,792,518 B2 | 9/2010 | Trioano et al. | |
| 7,848,500 B2 | 12/2010 | Lynam et al. | |
| 7,848,980 B2 | 12/2010 | Carlson | |
| 7,870,044 B2 | 1/2011 | Robertson | |
| 7,870,077 B2 | 1/2011 | Woo et al. | |
| 7,890,433 B2 | 2/2011 | Singhal | |
| 8,024,781 B2 | 9/2011 | Saunders et al. | |
| 8,073,774 B2 | 12/2011 | Pousti | |
| 8,116,730 B2 | 2/2012 | Smith | |
| 8,245,044 B2 | 8/2012 | Kang | |
| 8,249,964 B2 | 8/2012 | DePena | |
| 8,280,825 B2 | 10/2012 | Friedman | |
| 8,280,906 B1 | 10/2012 | Lillibridge et al. | |
| 2001/0003093 A1 | 6/2001 | Lundin | |
| 2001/0037264 A1 | 11/2001 | Husemann et al. | |
| 2001/0051920 A1 | 12/2001 | Joao et al. | |
| 2002/0004751 A1 | 1/2002 | Seki et al. | |
| 2002/0013727 A1 | 1/2002 | Lee | |
| 2002/0016769 A1 | 2/2002 | Barbara et al. | |
| 2002/0017561 A1 | 2/2002 | Tomoike | |
| 2002/0025797 A1 | 2/2002 | Joao et al. | |
| 2002/0035539 A1 | 3/2002 | O'Connell | |
| 2002/0059146 A1 | 5/2002 | Keech | |
| 2002/0072925 A1 | 6/2002 | Krim | |
| 2002/0087471 A1 | 7/2002 | Ganesan et al. | |
| 2002/0091538 A1 | 7/2002 | Schwartz et al. | |
| 2002/0102963 A1* | 8/2002 | Heinonen et al. | 455/406 |
| 2002/0111904 A1 | 8/2002 | Gruber et al. | |
| 2002/0111907 A1 | 8/2002 | Ling | |
| 2002/0111908 A1 | 8/2002 | Milberger et al. | |
| 2002/0120582 A1 | 8/2002 | Elston et al. | |
| 2002/0193094 A1 | 12/2002 | Lawless et al. | |
| 2003/0023505 A1 | 1/2003 | Eglen et al. | |
| 2003/0050854 A1 | 3/2003 | Showghi et al. | |
| 2003/0065525 A1 | 4/2003 | Giacchetti | |
| 2003/0119478 A1 | 6/2003 | Nagy et al. | |
| 2003/0125969 A1 | 7/2003 | Kizer et al. | |
| 2003/0126076 A1 | 7/2003 | Kwok | |
| 2003/0191711 A1 | 10/2003 | Jamison et al. | |
| 2003/0212601 A1 | 11/2003 | Silva et al. | |
| 2004/0019564 A1 | 1/2004 | Goldthwaite et al. | |
| 2004/0044582 A1 | 3/2004 | Chowdhary | |
| 2004/0122685 A1 | 6/2004 | Bunce | |
| 2004/0185827 A1* | 9/2004 | Parks | 455/406 |
| 2004/0230527 A1 | 11/2004 | Hansen et al. | |
| 2004/0248596 A1 | 12/2004 | Panchal | |
| 2004/0252814 A1 | 12/2004 | Eakin | |
| 2004/0254868 A1 | 12/2004 | Kirkland et al. | |
| 2005/0055296 A1 | 3/2005 | Hattersley et al. | |
| 2005/0055309 A1 | 3/2005 | Williams et al. | |
| 2005/0086164 A1 | 4/2005 | Kim et al. | |
| 2005/0144020 A1 | 6/2005 | Muzaffar et al. | |
| 2005/0177442 A1 | 8/2005 | Sullivan et al. | |
| 2005/0177517 A1 | 8/2005 | Leung et al. | |
| 2005/0197892 A1 | 9/2005 | Bilibin et al. | |
| 2005/0199709 A1 | 9/2005 | Linlor | |
| 2005/0245257 A1 | 11/2005 | Woodhill | |
| 2006/0018450 A1 | 1/2006 | Sandberg-Diment | |
| 2006/0121880 A1 | 6/2006 | Cowsar et al. | |
| 2006/0131390 A1 | 6/2006 | Kim | |
| 2006/0206709 A1 | 9/2006 | Labrou et al. | |
| 2006/0248011 A1 | 11/2006 | Hecht-Nielsen | |
| 2006/0253335 A1 | 11/2006 | Keena et al. | |
| 2006/0258331 A1 | 11/2006 | Syrett et al. | |
| 2006/0258397 A1 | 11/2006 | Kaplan et al. | |
| 2006/0259438 A1 | 11/2006 | Randle et al. | |
| 2006/0276171 A1 | 12/2006 | Pousti | |
| 2006/0294025 A1 | 12/2006 | Mengerink | |
| 2007/0005467 A1 | 1/2007 | Haigh et al. | |
| 2007/0011104 A1 | 1/2007 | Leger et al. | |
| 2007/0022019 A1 | 1/2007 | Sherwin et al. | |
| 2007/0027775 A1 | 2/2007 | Hwang | |
| 2007/0027803 A1 | 2/2007 | Brandes et al. | |
| 2007/0043664 A1 | 2/2007 | Wilkes | |
| 2007/0055440 A1 | 3/2007 | Denker et al. | |
| 2007/0061244 A1 | 3/2007 | Ramer et al. | |
| 2007/0063017 A1 | 3/2007 | Chen et al. | |
| 2007/0094080 A1 | 4/2007 | Wiken | |
| 2007/0100651 A1 | 5/2007 | Ramer et al. | |
| 2007/0118477 A1 | 5/2007 | Graves et al. | |
| 2007/0123219 A1 | 5/2007 | Lovell, Jr. | |
| 2007/0123229 A1 | 5/2007 | Pousti | |
| 2007/0124490 A1 | 5/2007 | Kalavade et al. | |
| 2007/0130025 A1 | 6/2007 | Nakajima | |
| 2007/0130044 A1 | 6/2007 | Rowan | |
| 2007/0133768 A1 | 6/2007 | Singh | |
| 2007/0156517 A1 | 7/2007 | Kaplan et al. | |
| 2007/0168462 A1 | 7/2007 | Grossberg | |
| 2007/0175978 A1 | 8/2007 | Stambaugh | |
| 2007/0179792 A1 | 8/2007 | Kramer | |
| 2007/0198510 A1 | 8/2007 | Ebanks | |
| 2007/0203792 A1 | 8/2007 | Rao | |
| 2007/0203836 A1 | 8/2007 | Dodin | |
| 2007/0208632 A1 | 9/2007 | Downes et al. | |
| 2007/0233597 A1 | 10/2007 | Petersen et al. | |
| 2007/0244731 A1 | 10/2007 | Barhydt et al. | |
| 2007/0244811 A1 | 10/2007 | Tumminaro | |
| 2007/0250711 A1 | 10/2007 | Storey | |
| 2007/0255653 A1 | 11/2007 | Tumminaro et al. | |
| 2007/0255662 A1 | 11/2007 | Tumminaro et al. | |
| 2007/0260556 A1 | 11/2007 | Pousti | |
| 2007/0265921 A1 | 11/2007 | Rempe | |
| 2007/0266034 A1 | 11/2007 | Pousti | |
| 2007/0266130 A1 | 11/2007 | Mazur et al. | |
| 2007/0270125 A1 | 11/2007 | Pousti | |
| 2007/0287413 A1 | 12/2007 | Kleitsch et al. | |
| 2008/0009263 A1 | 1/2008 | Pousti | |

(56) References Cited

U.S. PATENT DOCUMENTS

| | | |
|---|---|---|
| 2008/0010192 A1 | 1/2008 | Rackley, III et al. |
| 2008/0040139 A1 | 2/2008 | Pousti |
| 2008/0040265 A1 | 2/2008 | Rackley, III et al. |
| 2008/0040733 A1 | 2/2008 | Pousti |
| 2008/0051122 A1 | 2/2008 | Fisher |
| 2008/0052091 A1 | 2/2008 | Vawter |
| 2008/0052363 A1 | 2/2008 | Pousti |
| 2008/0057904 A1 | 3/2008 | Pousti |
| 2008/0065490 A1 | 3/2008 | Novick et al. |
| 2008/0072406 A1 | 3/2008 | Sinclair |
| 2008/0082509 A1 | 4/2008 | Bessieres et al. |
| 2008/0091614 A1 | 4/2008 | Bas Bayod et al. |
| 2008/0097851 A1 | 4/2008 | Bemmel et al. |
| 2008/0103984 A1 | 5/2008 | Choe et al. |
| 2008/0109279 A1 | 5/2008 | Csoka |
| 2008/0109528 A1 | 5/2008 | Knight et al. |
| 2008/0120190 A1 | 5/2008 | Joao et al. |
| 2008/0120698 A1 | 5/2008 | Ramia |
| 2008/0126145 A1 | 5/2008 | Rackley III et al. |
| 2008/0133403 A1 | 6/2008 | Hamzeh |
| 2008/0133735 A1 | 6/2008 | Thayer et al. |
| 2008/0140569 A1 | 6/2008 | Handel |
| 2008/0154727 A1 | 6/2008 | Carlson |
| 2008/0154772 A1 | 6/2008 | Carlson |
| 2008/0167017 A1 | 7/2008 | Wentker et al. |
| 2008/0177628 A1 | 7/2008 | Payette |
| 2008/0177661 A1 | 7/2008 | Mehra |
| 2008/0189186 A1 | 8/2008 | Choi et al. |
| 2008/0189211 A1 | 8/2008 | Obadia et al. |
| 2008/0201201 A1 | 8/2008 | Pousti |
| 2008/0208739 A1 | 8/2008 | Phillips |
| 2008/0228595 A1 | 9/2008 | Hill et al. |
| 2008/0233918 A1 | 9/2008 | Pousti |
| 2008/0262929 A1 | 10/2008 | Behr |
| 2008/0275779 A1 | 11/2008 | Lakshminarayanan |
| 2008/0279360 A1 | 11/2008 | Veenstra et al. |
| 2008/0281726 A1 | 11/2008 | Gupta |
| 2008/0287095 A1 | 11/2008 | Pousti |
| 2008/0288299 A1 | 11/2008 | Schultz |
| 2008/0288351 A1 | 11/2008 | Leung et al. |
| 2008/0307317 A1 | 12/2008 | Yohai-Giochais |
| 2009/0006184 A1 | 1/2009 | Leach et al. |
| 2009/0006217 A1 | 1/2009 | Smith |
| 2009/0006276 A1 | 1/2009 | Woolston |
| 2009/0024614 A1 | 1/2009 | Pousti |
| 2009/0029687 A1 | 1/2009 | Ramer et al. |
| 2009/0030838 A1 | 1/2009 | Jacob et al. |
| 2009/0044216 A1 | 2/2009 | McNicoll |
| 2009/0055292 A1 | 2/2009 | Chong et al. |
| 2009/0063178 A1 | 3/2009 | Pousti |
| 2009/0063312 A1 | 3/2009 | Hurst |
| 2009/0070583 A1 | 3/2009 | Von Mueller et al. |
| 2009/0077640 A1 | 3/2009 | Wang |
| 2009/0081989 A1 | 3/2009 | Wuhrer |
| 2009/0104888 A1 | 4/2009 | Cox |
| 2009/0112765 A1 | 4/2009 | Skowronek |
| 2009/0112768 A1 | 4/2009 | Hammad et al. |
| 2009/0119190 A1 | 5/2009 | Realinij |
| 2009/0124238 A1 | 5/2009 | Wilson |
| 2009/0150257 A1 | 6/2009 | Abrams et al. |
| 2009/0156170 A1 | 6/2009 | Rossano et al. |
| 2009/0157792 A1 | 6/2009 | Fiatal |
| 2009/0172402 A1 | 7/2009 | Tran |
| 2009/0177581 A1 | 7/2009 | Garcia et al. |
| 2009/0182634 A1 | 7/2009 | Park et al. |
| 2009/0182674 A1 | 7/2009 | Patel et al. |
| 2009/0192928 A1 | 7/2009 | Abifaker |
| 2009/0204546 A1 | 8/2009 | Haidar |
| 2009/0216687 A1 | 8/2009 | Burdick |
| 2009/0220060 A1 | 9/2009 | Wilson |
| 2009/0248483 A1 | 10/2009 | Kiefer |
| 2009/0265273 A1 | 10/2009 | Guntupali et al. |
| 2009/0281904 A1 | 11/2009 | Pharris |
| 2010/0010911 A1 | 1/2010 | Smith |
| 2010/0015944 A1 | 1/2010 | Smith |
| 2010/0015957 A1 | 1/2010 | Smith |
| 2010/0017285 A1 | 1/2010 | Smith |
| 2010/0049654 A1 | 2/2010 | Pilo |
| 2010/0057623 A1 | 3/2010 | Kapur |
| 2010/0070757 A1 | 3/2010 | Martinez |
| 2010/0094732 A1 | 4/2010 | Smith |
| 2010/0106620 A1 | 4/2010 | Marcus |
| 2010/0114775 A1 | 5/2010 | Griffen |
| 2010/0125514 A1 | 5/2010 | Blackhurst et al. |
| 2010/0125737 A1 | 5/2010 | Kang |
| 2010/0130165 A1 | 5/2010 | Snyder et al. |
| 2010/0145802 A1 | 6/2010 | Nowacek et al. |
| 2010/0153249 A1 | 6/2010 | Yuan et al. |
| 2010/0174629 A1 | 7/2010 | Taylor et al. |
| 2010/0179907 A1 | 7/2010 | Atkinson |
| 2010/0190471 A1 | 7/2010 | Smith |
| 2010/0191646 A1 | 7/2010 | Smith |
| 2010/0191648 A1 | 7/2010 | Smith |
| 2010/0216425 A1 | 8/2010 | Smith |
| 2010/0217696 A1 | 8/2010 | Schuba et al. |
| 2010/0223110 A1 | 9/2010 | Slavin et al. |
| 2010/0223183 A1 | 9/2010 | Smith |
| 2010/0228580 A1 | 9/2010 | Zoldi et al. |
| 2010/0235276 A1 | 9/2010 | Smith |
| 2010/0250359 A1 | 9/2010 | Gillenson et al. |
| 2010/0250687 A1 | 9/2010 | Smith |
| 2010/0267362 A1 | 10/2010 | Smith |
| 2010/0293065 A1 | 11/2010 | Brody et al. |
| 2010/0299220 A1 | 11/2010 | Baskerville |
| 2010/0299731 A1 | 11/2010 | Atkinson |
| 2010/0306015 A1 | 12/2010 | Kingston |
| 2010/0306099 A1 | 12/2010 | Hirson |
| 2010/0306832 A1 | 12/2010 | Mu et al. |
| 2010/0312645 A1 | 12/2010 | Niejadlik |
| 2010/0312678 A1 | 12/2010 | Davis |
| 2011/0010292 A1 | 1/2011 | Giordano et al. |
| 2011/0022484 A1 | 1/2011 | Smith et al. |
| 2011/0035240 A1 | 2/2011 | Joao et al. |
| 2011/0035264 A1 | 2/2011 | Zaloom |
| 2011/0035302 A1 | 2/2011 | Martell et al. |
| 2011/0065418 A1 | 3/2011 | Ryu et al. |
| 2011/0071922 A1 | 3/2011 | Hirson et al. |
| 2011/0072039 A1 | 3/2011 | Tayloe |
| 2011/0078077 A1 | 3/2011 | Hirson |
| 2011/0082767 A1 | 4/2011 | Ryu et al. |
| 2011/0082772 A1 | 4/2011 | Hirson |
| 2011/0125610 A1 | 5/2011 | Goodsall et al. |
| 2011/0131106 A1 | 6/2011 | Eberstadt et al. |
| 2011/0143710 A1 | 6/2011 | Hirson |
| 2011/0143711 A1 | 6/2011 | Hirson |
| 2011/0287748 A1 | 11/2011 | Angel et al. |
| 2011/0295750 A1 | 12/2011 | Rammal |
| 2011/0320291 A1 | 12/2011 | Coon |
| 2012/0036018 A1 | 2/2012 | Feliciano et al. |
| 2012/0158580 A1* | 6/2012 | Eram et al. ............... 705/39 |
| 2012/0171990 A1 | 7/2012 | Williams et al. |
| 2012/0323737 A1 | 12/2012 | Pousti et al. |

FOREIGN PATENT DOCUMENTS

| | | |
|---|---|---|
| JP | 2007179383 | 7/2007 |
| KR | 20000036574 | 7/2000 |
| KR | 20030030684 | 4/2003 |
| KR | 20060103797 | 10/2006 |
| KR | 20070051817 | 5/2007 |
| KR | 20070103650 | 10/2007 |
| KR | 20080011338 | 2/2008 |
| WO | 9738538 | 10/1997 |
| WO | 2007004792 | 1/2007 |
| WO | 2007084593 | 7/2007 |
| WO | 2007102648 | 9/2007 |
| WO | 2007127521 | 11/2007 |
| WO | 2009036511 | 3/2009 |
| WO | 2009044396 | 4/2009 |

OTHER PUBLICATIONS

"International Application No. PCT/US2009/033823", International Search Report and Written Opinion, Sep. 24, 2009.

(56) References Cited

OTHER PUBLICATIONS

"International Application No. PCT/US2009/039723", International Search Report and Written Opinion, Oct. 30, 2009.
"International Application No. PCT/US2010/020189", International Search Report and Written Opinion, Dec. 10, 2010.
"International Application No. PCT/US2010/021054", International Search Report and Written Opinion, Jul. 29, 2010.
"International Application No. PCT/US2010/024525", International Search Report and Written Opinion, May 17, 2010.
"International Application No. PCT/US2010/024535", International Search Report and Written Opinion, May 25, 2010.
"International Application No. PCT/US2010/030338", International Search Report & Written Opinion, Jun. 3, 2010.
"International Application No. PCT/US2010/032668", International Search Report and Written Opinion, Jul. 1, 2010.
"International Application No. PCT/US2010/036940", International Search Report and Written Opinion, Jul. 21, 2010.
"International Application No. PCT/US2010/037816", International Search Report and Written Opinion, Aug. 5, 2010.
"International Application No. PCT/US2010/042703", International Search Report and Written Opinion, Sep. 13, 2010.
"International Application No. PCT/US2010/046266", International Search Report and Written Opinion, Oct. 20, 2010.
"International Application No. PCT/US2010/050616", International Search Report and Written Opinion, Apr. 26, 2011.
"International Application No. PCT/US2010/057472", International Search Report and Written Opinion, Jan. 18, 2011.
"International Application No. PCT/US2010/059295", International Search Report and Written Opinion, Feb. 1, 2011.
"International Application No. PCT/US2010/059466", International Search Report and Written Opinion, Feb. 1, 2011.
"International Application No. PCT/US2011/022419", International Search Report and Written Opinion, Mar. 29, 2011.
"International Application No. PCT/US2011/022426", International Search Report and Written Opinion, Mar. 28, 2011.
"International Application No. PCT/US2011/029760", International Search Report and Written Opinion Oct. 28, 2011.
"International Application No. PCT/US2011/051094", International Search Report and Written Opinion Dec. 23, 2011.
"International Application No. PCT/US2011/30039", International Search Report and Written Opinion, May 23, 2011.
"International Application No. PCT/US2011/30038", International Search Report and Written Opinion, May 25, 2011.
"International Application No. PCT/US12/25195, International Filing Date Feb. 15, 2012", International Search Report and Written Opinion, Apr. 26, 2012.
"International Patent Application No. PCT/US11/51094 filed on Sep. 9, 2011", International Preliminary Report on Patentability mailed on Nov. 2, 2012, 17.
"International Preliminary Report on Patentability", International Application PCT/US12/25195, filed Feb. 15, 2012.
Onebip S.R.L , "OneBip—to Pay Online with Your Mobile Phone", Youtube online video at http://www.youtube.com/watch?v=RiEsMcc0tJY, May 23, 2007.
Amazon.Com, Inc. "Get Gold Box Deals Every Day with Amazon Text Alerts", located at http://www.amazon.com/gp/ anywhere/sms/goldbox, available at least by Jun. 10, 2009.
Aradiom Inc., , "The Real Solution—Aradiom SolidPass", located at http://www.aradiom.com/SolidPass/2fa-OTP¬ security-token.htm, available at least by Apr. 24, 2009.
Arrington, Michael , "Mobile Payments Getting Traction on Social Networks but Fees are Sky High", Tech Crunch, located a http://techcrunch.com/2009/01/13mobile-payments-getting-traction-on-social-networks-but-fees-are-sky-high/,, Jan. 13, 2009.
Brooks, Rod , "MobilCash:Worlds First in Mobile Payments", YouTube online video located at http://youtube.com/wacth?v=j6Xv35qSmbg,, Oct. 12, 2007.
Bruene, Jim , "PayPal Launches on Facebook: Who Wants to be the First Bank?", located at http://www.netbanker.com/2007/06paypal_launches_on_facebook_who_wants_to_be_the_first_bank_on_facebook.hml,, Jun. 22, 2007.
Chen, Will , "Gift Shop Credits Have Arrived", The Facebook Blog, located at gttp://blog.facebook.com/blog.php?post=36577782130, Oct. 31, 2008.
Ching, Andrew T. et al., "Payment card rewards programs and consumer payment choice", Journal of Banking & Finance, vol. 34, Issue 8, http://dx.doi.org/10.1016/j.jbankfin.2010.03.015. (http://www.sciencedirect.com/science/article/pii/S0378426610001196), ISSN 0378-4266, Aug. 2010, pp. 1773-1787.
Chua, Lye H. , "How Customers Applied Java CAPS?", Sun Microsystems, Inc. presentation, Nov. 6, 2007.
Federal Trade Commission "Children's Online Privacy Protection Act (COPPA)", 15 U.S.C. §§ 6501-6506, Oct. 21, 1998.
Garry, Michael , "Ending the paper chase", Progressive Grocer, May 1994.
Hassinen, Marko et al., "An Open, PKI-Based Mobile Payment System", Emerging Trends in Information and Communication Security, Lecture Notes in Computer Science, vol. 3995/2006, pp. 86-89, Jun. 1, 2006.
Ihlwan, Moon , "In Korea, Cell Phones Get a New Charge", http://businessweek.com/globalbiz/content/mar2006/gb20060301_260288.htm, Mar. 1, 2006.
Lee, Jessica , "Payment Industry Perspectives: Q&A with Zong CEO David Marcus", http://www.insidefacebook.com/2009/05/19payment-industry-perspectives-qa-with-zong-ceo-david-marcus/, May 19, 2009.
Mobilians Co. Ltd., , company website located at http://www.mobilians.co.kr/english/, available at least by Jan. 12, 2009.
National Consumers League, , "Mobile commerce: what's all the buzz?", http://www.nclnet.org/personal-finane/60-mobile-commerce/314-mobile-commerce-what . . . , Mar. 3, 2007.
Nicole, Kirsten , "Pay me Lets You Send and Receive Money Through Facebook", http://mashable.com/2007/06/17pay-me-facebook-app, Jun. 17, 2007.
Paypal, Inc, , "Get What You Want, When You Want It", , located at https://www.paypal.com/cgi-bin/webscr?cmd=xpt/ Marketing/mobile/MobileBuyStuff-outside, available at least by Mar. 5, 2009.
Paypal, Inc., , "Texting with PayPal—Easy as Lifting a Finger", located at https://www.paypal.com/cgi-bin/webscr?cmd=xpt/Marketing/mobile/MobileAdvancedFeatures-outside, available at least by Mar. 5, 2009.
Squidoo, LLC, , "ntroducing MobillCash: Make a Secure Sale Even When an Online Customer Has No Cash, Credit Cards or I.D.", located at http://www.squidoo.com/mobillcash-pay-by-mobile-phone, available at least by Aug. 29, 2008.
Sun Microsystems Inc., , "The Road to Mobile Banking", white paper, Jun. 2008.
Tindal, Suzanne , "St. George Counts Down to Two-Factor Authentication", ZDNet Australia, Feb. 19, 2008.
Trusted Mobile Payment Framework, , "Scheme Rules", version 2.0, Aug. 6, 2008.
Verizon, "Ring Tones & Ringback Tones—Terms and Conditions", http://support.verizonwireless.com/terms/products/ringtones_ringbacktones.html, May 6, 2009.
Visualtron Software Corporation, , "2-Factor Authentication—What is MobileKey?", located at http://www.visualtron. com/products_mobilekey.htm, available at least by 2008.
Wikimedia Foundation, Inc., , "Authentication", located at en.wikipedia.org/wiki/Authentication, Mar. 17, 2009.
Wikimedia Foundation, Inc., , "Credit Card", located at en/wikipedia.org/wiki/Credit_card, Dec. 5, 2008.
Wikimedia Foundation, Inc., , "Two-Factor Authentication", located at en.wikipedia.org/wiki/Two-factor_authentication, Apr. 24, 2009.
Zabawskyj, Bohdan , "In the Media: The Mobile Money Opportunity", , Billing World and OSS Today, located at http://www.redknee.com/news_events/in_the_media/43/?PHPSESSID=1e0ca1ab057bf9dc2c88104877ca8010, Sep. 2007.

(56) References Cited

OTHER PUBLICATIONS

Zong, Inc., , "Virtual Goods/Currency and Mobile Payments: The Business Model for Social Apps", The Zong Blog at http://blog-zong.com/2008/10/25/virtual-goods-currency-and-mobile-payments-the-business-model-for-social-apps/, Oct. 28, 2008.

Zong, Inc., , "Zong Mobile Payment Demo on a Facebook App", You Tube online video at http://www.youtube.com/watch?v=aLjRcAFrGil, Jan. 5, 2009.

Zong, Inc., , "Zong-Mobile Payments for Your Web App", You tube online video at http://www.youtube.com/watch?v=O2C3SQraAvQ, Sep. 5, 2008.

Zong, Inc., , "Zong Mobile Payments in Smallworlds", You Tube online video at htttp://www.youtube.com/watch?v=Y6CEw3tSgBc, Feb. 10, 2009.

* cited by examiner

SYSTEMS AND METHODS TO FACILITATE REPEATED PURCHASES

CROSS-REFERENCE TO RELATED APPLICATIONS

This is a continuation of prior U.S. patent application Ser. No. 13/453,198, filed on Apr. 23, 2012, which claims priority from U.S. Provisional Patent Application No. 61/479,200, filed on Apr. 26, 2011, all of which are incorporated herein by reference in their entirety.

FIELD OF THE TECHNOLOGY

At least some embodiments of the disclosure relate to mobile communications in general and, more particularly but not limited to, mobile communications to facilitate online transactions.

BACKGROUND

Short Message Service (SMS) is a communications protocol that allows the interchange of short text messages between mobile telephone devices. SMS messages are typically sent via a Short Message Service Center (SMSC) of a mobile carrier, which uses a store-and-forward mechanism to deliver the messages. When a mobile telephone is not reachable immediately for the delivery of the message, the SMSC stores the message for later retry.

SMS messages can be sent via gateways. Some gateways function as aggregators. An aggregator typically does not have the capacity the deliver the messages directly to the mobile phones. An aggregator typically interfaces with and relies upon the SMSC of a mobile carrier to deliver SMS messages.

Some gateways function as providers that are capable of sending text messages to mobile devices directly, without going through the SMSC of other mobile operators.

Text messaging between mobile telephones can also be performed using other protocols, such as SkyMail and Short Mail in Japan.

Some mobile carriers provide email gateway services to allow text messages to be sent to mobile phones via email. For example, a non-subscriber of the mobile carrier may send a message to an email address associated with a mobile phone of a subscriber of the mobile carrier to have the message delivered to the mobile phone via text messaging.

Emails can also be sent to mobile telephone devices via standard mail protocols, such as Simple Mail Transfer Protocol (SMTP) over Internet Protocol Suite (commonly TCP/IP, named from two of the protocols: the Transmission Control Protocol (TCP) and the Internet Protocol (IP)).

Short messages may be used to provide premium services to mobile phones, such as news alerts, ring tones, etc. The premium content providers may send the messages to the SMSC of the mobile operator using a TCP/IP protocol, such as Short Message Peer-to-peer Protocol (SMPP) or Hypertext Transfer Protocol, for delivery to a mobile phone; and the mobile phone is billed by the mobile operator for the cost of receiving the premium content.

Premium services may also be delivered via text messages initiated from the mobile phone. For example, a televoting service provider may obtain a short code to receive text messages from mobile phones; and when the user sends a text message to the short code, the mobile carrier routes the message to the televoting service provider and charges the user a fee, a portion of which is collected for the televoting service provider.

SUMMARY OF THE DESCRIPTION

Systems and methods are provided to facilitate repeated online transactions. Some embodiments are summarized in this section.

In one aspect, a system includes a data storage facility configured to store payment transaction records associated with phone numbers, and an interchange coupled with the data storage facility. The interchange includes a common format processor and a plurality of converters to interface with a plurality of different controllers of mobile communications. The converters are configured to communicate with the controllers in different formats; and the converters are configured to communicate with the common format processor in a common format to facilitate deposit transactions and payment transactions.

In one embodiment, the payment transaction records include at least one record for a successful prior payment transaction, which record includes data indicating a user selection of an option to authorize a respective merchant involved in the prior payment transaction to request payments on behalf of a user of a phone number associated with the record.

In one embodiment, in response to a message from the mobile phone having the phone number, the common format processor is configured to identify the prior payment transaction associated with the phone number of the mobile phone, communicate with the merchant to repeat a purchase identified according to the prior payment transaction, and transmit via one of the converters a plurality of premium messages to the mobile phone to collect funds for a payment to repeat the purchase.

In one embodiment, in response to a payment request from the merchant, the common format processor is configured to determine whether to accept or reject the payment request based at least in part on the data indicating the user selection of the option.

In another aspect, a computer-implemented method includes: receiving a message from a mobile phone having a phone number; identifying, in response to the message, a previous payment transaction processed by the computing device for the phone number; communicating with a merchant to repeat a purchase identified according to the previous payment transaction; and processing a payment to the merchant using funds associated with the phone number to repeat the purchase.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, an interchange is used to interface with a plurality of different controllers of mobile communications, such as SMS messages. The interchange can be used to receive deposit requests and payment requests in an online environment. The interchange is configured to communicate with the mobile phones through the different controllers to provide security and convenience for online transactions.

Figure 1:
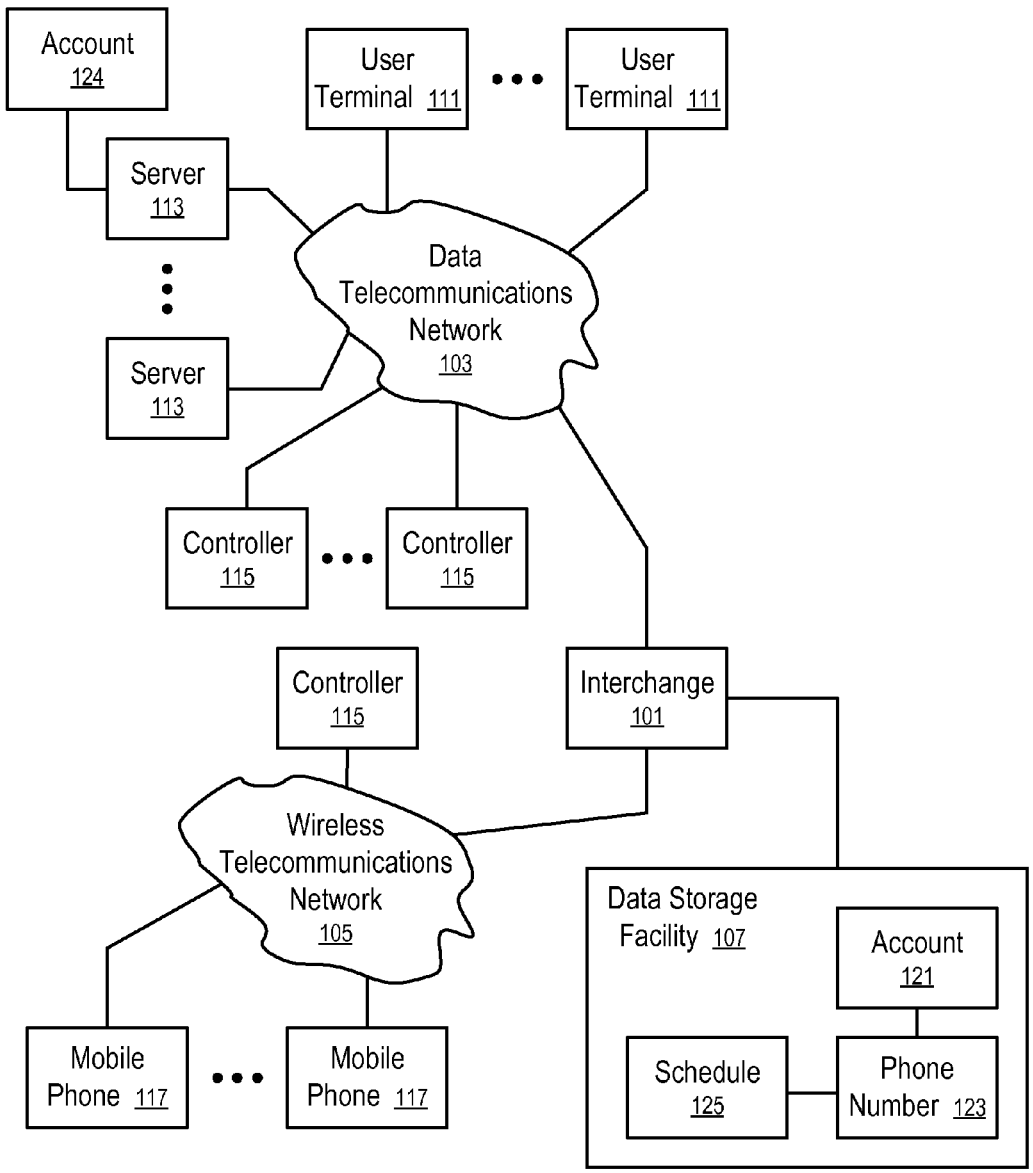
FIG. 1 shows a system to facilitate online transactions according to one embodiment.

FIG. 1 shows a system to facilitate online transactions according to one embodiment. In FIG. 1, an interchange (101) is provided to interface with a plurality of different controllers (115) for communications with the mobile phones (117) over the wireless telecommunications network (105).

In FIG. 1, a data storage facility (107) stores user accounts (121) and the corresponding phone numbers (123) of the mobile phones (117). The interchange (101) is coupled with the data storage facility (107) to confirm operations in the accounts (121) of the users via mobile communications with the mobile phones (117) at the corresponding phone numbers (123).

In FIG. 1, the interchange (101) may communicate with different controllers (115) of mobile communications via different networks (e.g., 105 and 103) and/or protocols. The interchange processes the requests in a common format and uses a set of converters for communications with the different controllers (115) respectively.

For example, the controllers (115) may be different aggregators, providers and/or SMSCs of different mobile carriers. Based on the phone numbers (123), the interchange (101) interfaces with the corresponding controllers (115) to communicate with the mobile phones (117) via text messaging to confirm the operations related to the corresponding accounts (121).

In FIG. 1, the user terminals (111) may use a unified interface to send requests to the interchange (101). For example, a web site of the interchange (101) may be used to receive deposit requests from the web browsers running in the user terminals (111). The deposit requests may be received directly from the user terminal (111), or via a third party which interfaces between the interchange (101) and the user terminal (111). For example, the third party may operate a web site to receive deposit requests from the user terminal (111) and provide the deposit requests to the interchange (101) via an application programming interface (API) (e.g., an API provided using a web service). The user terminals (111) are typically different from the mobile phones (117). In some embodiments, users may use the mobile phone (117) to access the web and submit the deposit request. Alternatively, the users may use the mobile phone (117) to submit the deposit requests via text messaging, email, instant messaging, etc.

The use of the mobile phones (117) in the confirmation of the accounts (121) increases the security of the transaction, since the mobile phones (117) are typically secured in the possession of the users.

Further, in one embodiment, the interchange (101) may use the phone bills of the mobile phones (117) to collect funds for the accounts (121) that are associated with the mobile phones (117) for the convenience of the users (e.g., those who do not have a credit card or a bank account).

In one embodiment, once the user accounts (121) are funded through the mobile phones (117), the users may use the user terminals (111) to access online servers (113) to make purchases. The users can use the accounts (121) to make the payment for the purchases, using the user terminals (111), without revealing their financial information to the operators of the servers (113).

In other embodiments, the interchange (101) may use other fund sources to deposit funds into the account (121). For example, the data storage facility (107) may further store information about other financial accounts of the user, such as bank accounts, credit card accounts, PayPal accounts, etc. (not shown in FIG. 1). Such information about the financial accounts of the user can be associated with the phone number (123) in the data storage facility (107). In response to a deposit request from the user terminal (111), the interchange (101) may identify the phone number (123) to retrieve the information about at least one financial account of the user. Using the phone number (123) the interchange (101) may transmit a confirmation message to the corresponding mobile phone (117). If the user replies to the confirmation message from the mobile phone (117), the interchange (101) may charge the financial account of the user (e.g., via automated clearing house (ACH)) using the information about the financial account to deposit funds into the account (121) of the user. Alternatively, the user may provide the information about the financial account (e.g., a bank account, a credit card number, a charge card number, etc.) from the mobile phone (117) together with the user's reply to the confirmation message. Alternatively, the user may provide the information about the financial account (e.g., a bank account, a credit card number, a charge card number, etc.) from the user terminal (111) together with the deposit request.

In one embodiment, the funds stored in the account (121) are in the unit of a currency (e.g., U.S. dollar, Euro, British pound, etc.) In some embodiments, the funds stored in the account (121) may be in the equivalent unit of a currency, such as points, stars, virtual currency/money, etc.

In one embodiment, the mobile phones (117) are used by the corresponding users to make payments and/or manage funds, such as for making purchases in various websites hosted on the servers (113) of merchants and service providers and/or for transferring funds to or from an account (121) hosted on the data storage facility (107), or other accounts, such as telecommunication accounts of the mobile phones (117) with telecommunication carriers, phone bills of landline telephone services, credit card accounts, debit card accounts, bank accounts, etc. The mobile phones (117) are used to confirm and/or approve the transactions associated with account (121) (or other accounts). The interchange (101) interfaces the mobile phones (117) and the servers (113) to confirm and/or approve transactions and to operate on the account (121) (and/or other accounts associated with the phone number (123)).

For example, the user terminal (111) may provide the phone numbers (123) to the servers (113) to allow the servers (113) to charge the accounts (121) via the interchange (101). The interchange (101) sends a message to the mobile phone (117) via the phone number (123) to confirm the payment. Once the payment is confirmed via the corresponding mobile phone (117), the interchange (101) pays the server (113) using the funds from the corresponding the account (121) (and/or other accounts associated with the phone number (123)), such as bank accounts, credit card accounts, debit card accounts, mobile phone bills/accounts, land-line phone bill/accounts, etc.).

In one embodiment, the user terminal (111) may not even provide the phone number (123) to the server (113) to process the payment. The server (113) redirects a payment request to the interchange (101), which then prompts the user terminal (111) to provide the phone number (123) to the web site of the interchange (101).

For example, the server (113) may redirect the payment request to the web site of the interchange (101) with a reference indicating the purchase made via the user terminal (111). The interchange (101) can use the reference to complete the payment with the server (113) for the purchase, after receiving the phone number (123) directly from the user terminal (111), or other information identifying the account (121), to confirm the payment via the mobile phone (117).

In one embodiment, when the interchange (101) charges on the phone bill of the mobile phone (117) to fund the account (121), the mobile carrier of the mobile phone (117) may deduct a portion from the billed amount from the funds provided to the interchange (101). Thus, the interchange (101) actually receives only a portion of the amount billed to the mobile phone (117). However, the interchange (101) may credit the full amount to the account (121) associated with the mobile phone (117). The fees taken by the mobile carrier can be recovered through charging the user and/or the merchant for the usage of the account (121).

For example, the interchange (101) may charge the account (121) a fee for paying the server (113) to complete a purchase; and the interchange (101) may charge the server (113) a fee for transferring the funds to the server (113) (e.g., by deducting a portion from the amount paid by the user to the operator of the server (113)). For example, the interchange (101) may charge a periodic fee (e.g., a monthly fee) to maintain the account (121). The interchange (101) may charge a fee when the funds are initially deposited into the account (121) via the mobile phone (117), where the fee is smaller than the fee charged by the mobile carrier.

In one embodiment, the overall fees charged by the interchange (101) may be equal to or larger than the initial fees charged by the mobile carrier to deposit the funds into the account (121), to avoid losing money. In some embodiment, the operations of the interchange (101) may be supported by advertisements; and the interchange (101) may charge less than what the mobile carrier charges to deposit the funds into the account (121).

For example, the interchange (101) may spread out the charges by the mobile carrier for depositing the funds into the account (121) on a per transaction basis or a per process basis, instead of a lump sum at the time the user deposits funds into his account (121).

For example, the interchange (101) may charge the user account (121) a smaller fee than what the mobile carrier charges, when the funds are initially deposited into the user account (121) via the mobile carrier. For instance, when a user deposits $10 to the account (121) via the mobile carrier, the mobile carrier may take $3 (30%), providing $7 to the interchange (101). The interchange (101) may charge the user only $1, and thus credit the account (121) with $9; alternatively, the interchange (101) may credit the account (121) with the full $10, without deducting the amount that is charged by the mobile carrier, at the time the funds are deposited.

However, for the amount credited to the account (121), the interchange (101) is configured to pass to the merchants only $7 of the funds received from the mobile carrier for the purchases made by the user. The merchants may be the operators of the servers (113). The interchange (101) may charge the user and/or the merchant fees on a per transaction basis. For example, the user may be charged an amount for a payment to the merchant; and the merchant may be charged another amount for the payment. Thus, the fees charged by the mobile carrier are actually deferred until the funds in the account are used; and the cost for the fees charged by the mobile carrier can be shared by the user and the merchant.

In some embodiments, the user may request a loan from the interchange (101) for the account (121); and the loan is repaid through billing the mobile phone (117). The interchange (101) may charge interest for the loan.

In one embodiment, the interchange (101) allows the users to schedule recurring or nonrecurring transactions according to a calendar. The data storage facility (107) stores the schedule (125) of the transactions associated with the phone number (123). Based on the schedule (125), the interchange (101) can collect funds via the telecommunication carriers before the scheduled dates for the transactions, store the funds in the account (121), and complete the transactions on the scheduled dates using the funds in the account (121).

Figure 2:
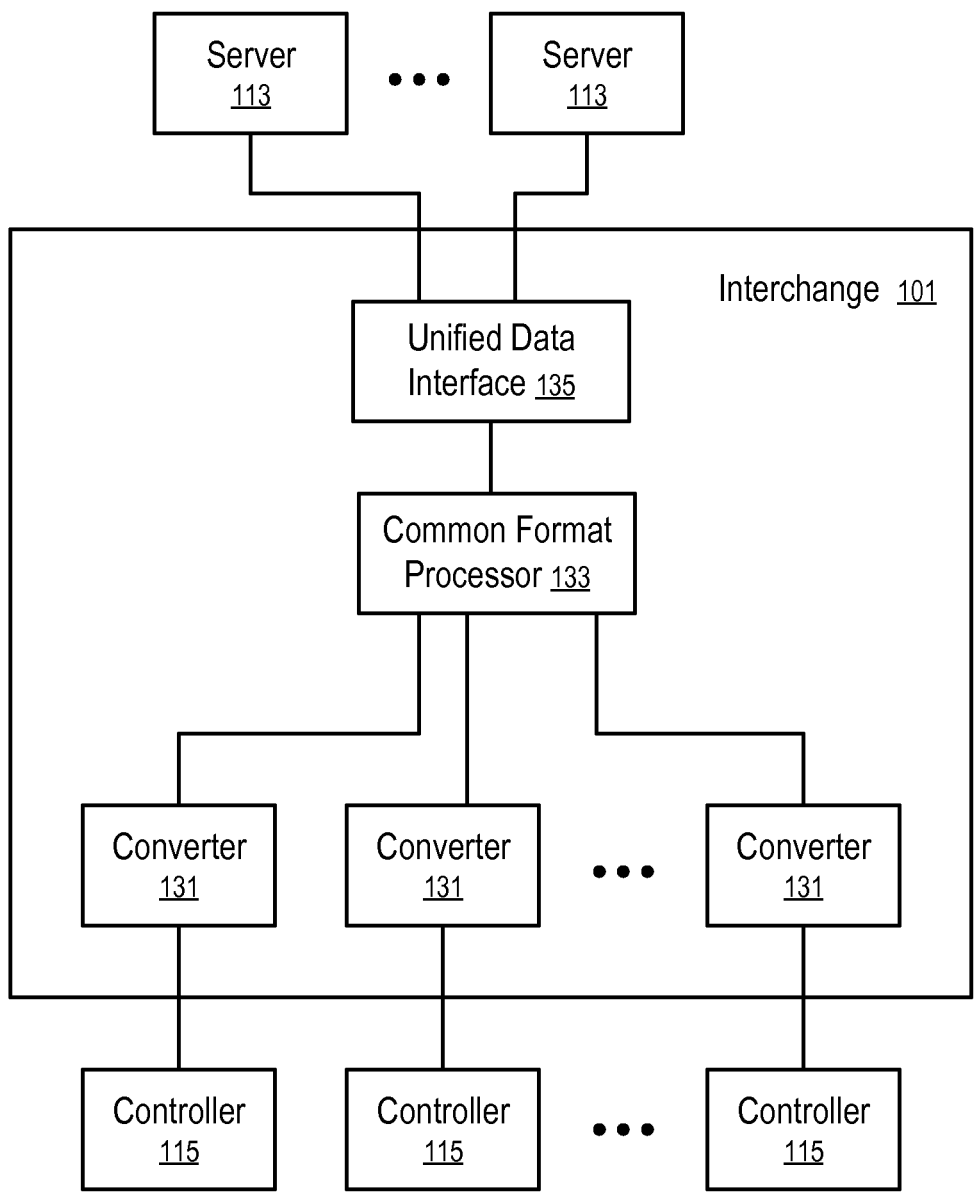
FIG. 2 shows an interchange to route messages according to one embodiment.

FIG. 2 shows an interchange to route messages according to one embodiment. In FIG. 2, the interchange (101) includes a unified data interface (135) for interaction with the servers (113). The servers (113) may redirect the payment requests to the interchange (101) to allow the interchange (101) to subsequently communicate with the user to process the payment request, including obtaining payment options and identifying user accounts (121), before returning to communicating with the server (113). Alternatively, the servers (113) may collect account related information (e.g., the phone number of the user) to request payment from the interchange (101).

In FIG. 2, the interchange (101) includes a common format processor (133), which processes various payment options in a common format. In one embodiment, the common format processor (133) can handle the payments via mobile terminated text message, mobile originated text message, operator bill, credit card, stored value account (121), and other online payment options. The common format processor (133) determines the actual amount that is to be billed to the user, based on the payment options (e.g., mobile terminated premium SMS, mobile originated premium SMS, operator billing, credit cards, etc.), and selects a converter (131) to communicate with a corresponding controller (115).

Different converters (131) are configured to communicate with corresponding controllers (115) in different languages and protocols. The converters (131) perform the translation between the common format used by the common format processor (133) and the corresponding formats used by the controllers (115).

The use of the common format processor (133) simplifies the structure of the interchange (101) and reduces the development effort required for the interchange (101) to interface with the increasing number of different controllers, such as SMSC, mobile providers, aggregators, gateways, etc.

Figure 3:
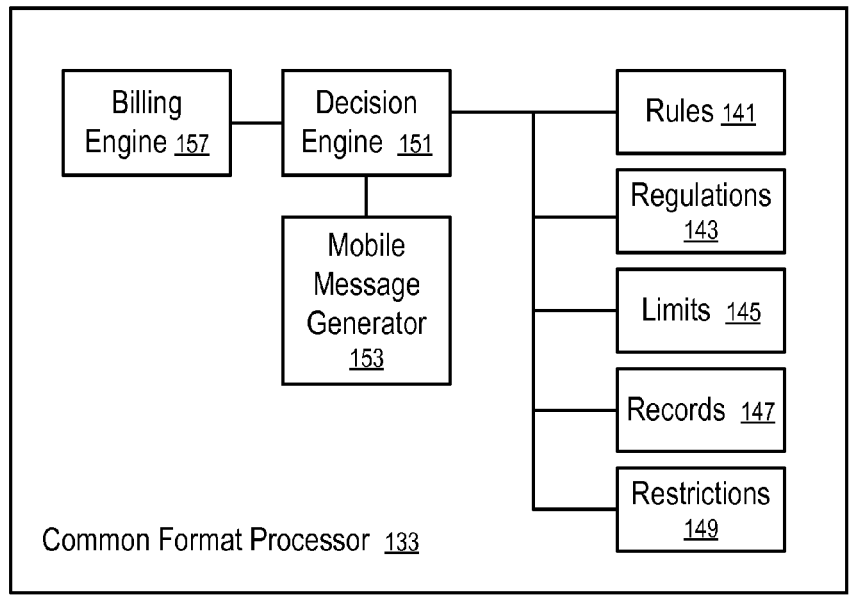
FIG. 3 shows a message processor according to one embodiment.

FIG. 3 shows a message processor according to one embodiment. In FIG. 3, the common format processor (133) includes a billing engine (157) that calculates the amount to be billed to the user, by adding or subtracting transaction costs for different billing methods, such as mobile terminated text message, mobile originated text message, operator bill, credit card, stored value account (121), and other online payment options.

The common format processor (133) includes a decision engine (151) which decides how to generate a set of one or more messages to the mobile phone (117), based on a set of rules (141), regulations (143), limits (145), records (147) and restrictions (149).

For example, different countries have different regulations (143) governing the mobile communications with the mobile phones (117). For example, different mobile carriers have different rules (141) regarding premium messages. For example, past transaction records (147) can be used to monitor the transactions to discover suspected fraudulent activities. For example, parental limits (145) and merchant restrictions (149) can be imposed.

Base on results of the decision engine (151), the mobile message generator (153) generates one or more messages to communicate with the mobile phone (117) about the transaction (e.g., a deposit request or a payment request). The converter (131) then interfaces with the corresponding controller (115) to transmit the messages to the mobile phones (117).

Figure 4:
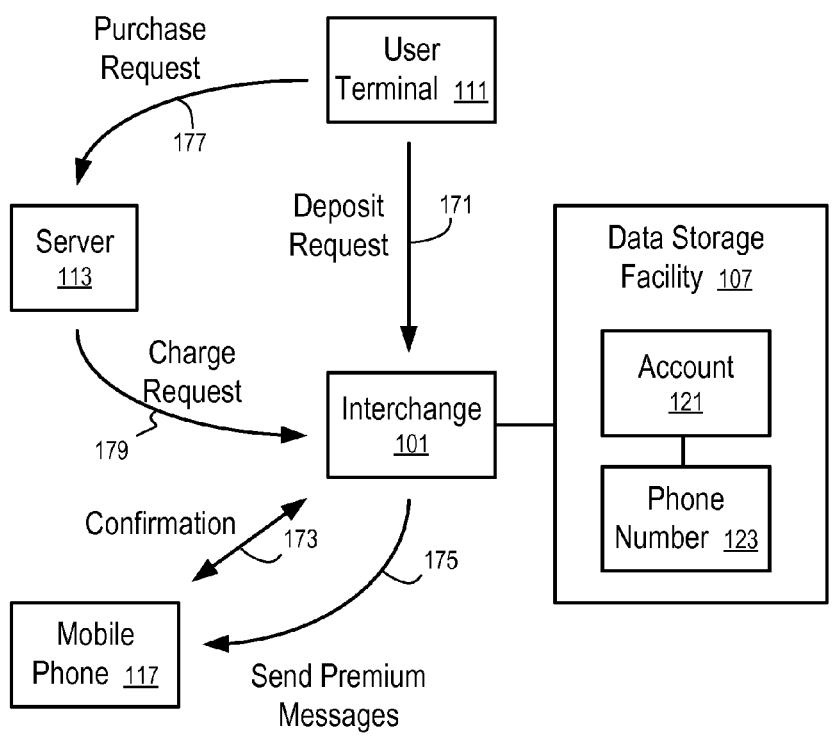
FIG. 4 shows a method to facilitate an online transaction using an interchange according to one embodiment.

FIG. 4 shows a method to facilitate an online transaction using an interchange according to one embodiment. In FIG. 4, the interchange (101) receives a deposit request (171) from a user via a user terminal (111), such as a device running a web browser. The user terminal (111) is typically different from the mobile phone (117). However, in some embodiments, the mobile phone (117) may also be used as the user terminal (111) to submit the deposit request (171).

The deposit request (171) may be a request for a loan to fund the user account (121) associated with the phone number (123) and stored in the data storage facility (107), or a request to fund the account (121) via premium messages (175) charged to the mobile phone. The loan may be repaid via subsequent premium messages (175) charged to the mobile phone.

In FIG. 4, the deposit request (171) is confirmed via a round trip confirmation message from the interchange (101) to the mobile phone (117), such as a round trip SMS message. Alternatively, the confirmation messages can be sent to the mobile phone (117) associated with the phone number (123) via emails, instant messages, etc. After the confirmation, the interchange (101) sends the premium messages (175) to bill the mobile phone for the deposit (or to make a loan to the account (121)). In other embodiments, the interchange (101) may charge a credit card account, or a bank account, associated with the phone number (123) to fund the account (121). In some embodiments, the interchange (101) may send an instruction with the confirmation message to the mobile phone (117) to instruct the user to send mobile originated premium messages to the interchange (101) to fund the account (121).

The account (121) stored in the data storage facility (107) can be used to pay purchases made via the server (113). For example, after the user terminal (111) transmits the purchase request (177) to the server (113), the server (113) redirects the purchase request to the interchange (101), or directly contacts the interchange (101) for the payment (e.g., after collecting account information, such as the phone number (123), from the user terminal (111)).

To complete the payment, the interchange (101) contacts the mobile phone (117) via text messaging (or other types of messages, such as instant messages, emails, etc.) to confirm the payment. The interchange (101) uses the funds in the account (121) to make the payment once a confirmation is obtained from the mobile phone (117). For example, the interchange (101) may use its own bank account to pay the merchant operating the server (113) and deduct an amount from the account (121). Thus, the financial information of the user is not revealed to the merchant.

Figure 5:
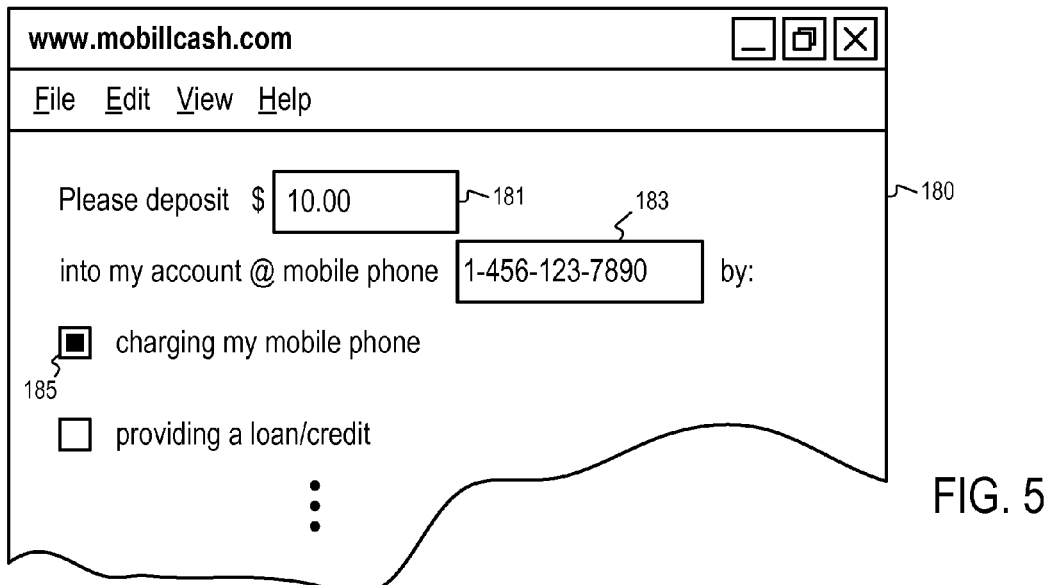
FIG. 5 illustrates a user interface to initiate a deposit transaction according to one embodiment.

FIG. 5 illustrates a user interface to initiate a deposit transaction according to one embodiment. In FIG. 5, the user interface (180) may be presented via a web browser (or a custom application) to submit a deposit request from a user terminal (111) to the interchange (101). Alternatively, the deposit request can be submitted from the mobile phone (117) via a message sent via SMS, WAP, voice mail, or via an interactive voice response (IRV) system. In FIG. 5, the user interface (180) includes a text field (181) that allows the user to specify a particular amount to be deposited into the account (121) associated with the phone number (123) specified in the text field (183).

In FIG. 5, the user interface (180) further includes an option list, which allows the user to select various ways to fund the account (121), such as charging the mobile phone (117) on its phone bill, requesting a loan (e.g., to be repaid via the phone bill), charging credit cards or bank accounts associated with the account (121), etc. In the example illustrated in FIG. 5, the checkbox (185) is selected to request a deposit via charging the mobile phone (117) (e.g., via premium messages, via operator billing by mobile phone carrier).

In one premium message billing method, the interchange (101) sends mobile terminated premium SMS messages to the mobile phone (117) to bill the user, or requests the mobile phone (117) to send mobile originated premium SMS messages to a short code representing the interchange (101).

In one operator billing method, the interchange (101) directly sends a message to the mobile carrier of the mobile phone (117) to bill the amount on the phone bill of the mobile phone (117), without having to send a premium message to the mobile phone (117).

In one embodiment, after the deposit request is submitted via the user interface (180), the interchange (101) sends a text message to the mobile phone (117) to request a confirmation.

Figure 6:
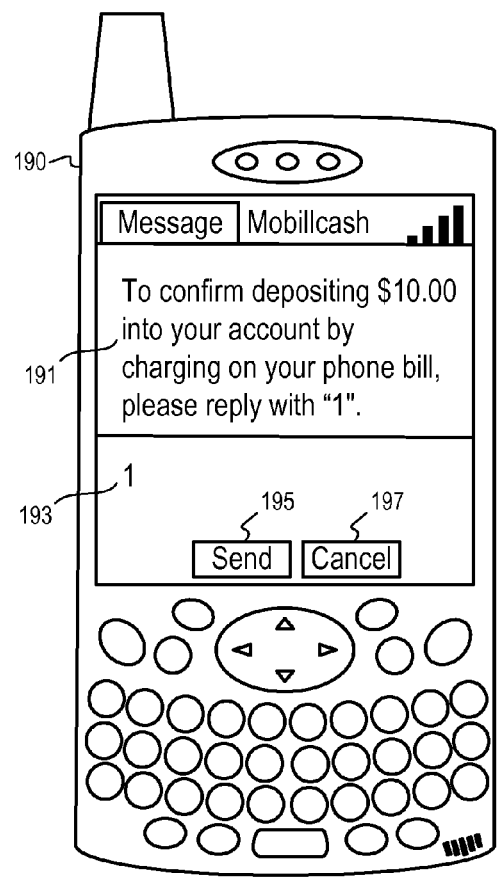
FIG. 6 illustrates a user interface to confirm a deposit transaction according to one embodiment.

FIG. 6 illustrates a user interface to confirm a deposit transaction according to one embodiment. In FIG. 6, the user interface (190) is presented via a mobile phone (117). The text message (191) from the interchange (101) includes the amount requested by the user (e.g., via the user interface (180)) and instructs the user to reply with a code (e.g., "1") to confirm the request. In one embodiment, the confirmation message (191) is transmitted to the mobile phone (117) via SMS (or text messaging via other protocols). In other embodiment, the confirmation message (191) can be sent to the mobile phone (117) via email, wireless application protocol (WAP), a voice message, a voice call from an automated voice system (e.g., controlled via an interactive voice response system), etc.

In the user interface (190), the user may enter the code (193) (e.g., "1") in the reply message and select the "send" (195) button to confirm the deposit request (or select the "cancel" (197) button to ignore the message and thus block the request).

In one embodiment, the code requested in the text message (191) is a predetermined code and is provided in the text message (191). The presence of the code in the reply message is an indication of the user approving the request; and the requirement for such a code in the reply eliminates false confirmations (e.g., generated via accidental replies or automated replies).

In some embodiments, the code requested in the text message (191) may be a personal identification number (PIN) associated with the account (121). The text message (191) does not include the code; and the knowledge of the code is an indication of the identity of the user. Thus, the use of such a code increases the security of the transaction.

In a further embodiment, the code requested in the text message (191) includes a code that is provided in response to the deposit request (e.g., via the user interface (180), not shown in FIG. 5). The code may be generated randomly at the time the request is received via the user interface (180), or when the user interface (180) is presented to the user. The code provided to the user interface (180) can be requested in the reply received in the user interface (190) to indicate that the user who is in possession of the mobile phone (117) has actual knowledge about the deposit request submitted via the user interface (180).

In a further embodiment, a secret code is provided in the confirmation message (191). The user may use the secret code in the user interface (180) provided on the user terminal (111) to confirm that the user has received the secret code provided to the mobile phone (117) and approve the deposit request via the mobile phone (117) without having to reply from the mobile phone (117). In one embodiment, the secret code is a random number, a random character string, or a random string of words generated by the interchange (101) in response to the deposit request. In some embodiment, the secret code is an identifier that represents the transaction associated with the deposit request. The user may approve the confirmation message via providing the secret code back to the interchange (101) via replying from the mobile phone (117) where the user receives the secret code, and/or replying from the user terminal (111) where the user initially submits the deposit request.

After the confirmation message is received with the correct code, the interchange (101) performs operations to fund the account (121), according to user selected options.

In some embodiments, the user may select the options via the replying text message sent via the user interface (190), instead of the user interface (180) used to make the request. In some embodiments, the user may make the request via a mobile phone (e.g., by sending a text message to a short code representing the interchange (101)).

In a premium message billing method, the interchange (101) calculates the required premium messages to bill to the mobile phone (117). For example, mobile terminated premium SMS messages may have a predetermined set of prices for premium messages. The interchange (101) determines a combination of the premium messages that has a price closest to the amount specified by the user, and sends this combination of premium messages to the mobile phone (117) according to the rules (141), regulations (143), limits (145), records (147), restrictions (149), etc.

Mobile originated premium SMS messages may also have a predetermined set of prices for premium messages. The interchange (101) can calculate the set of messages required to make the deposit and transmit a text message to the mobile phone (117) of the user to instruct the user to send the required number of premium messages to make the deposit.

Figure 7:
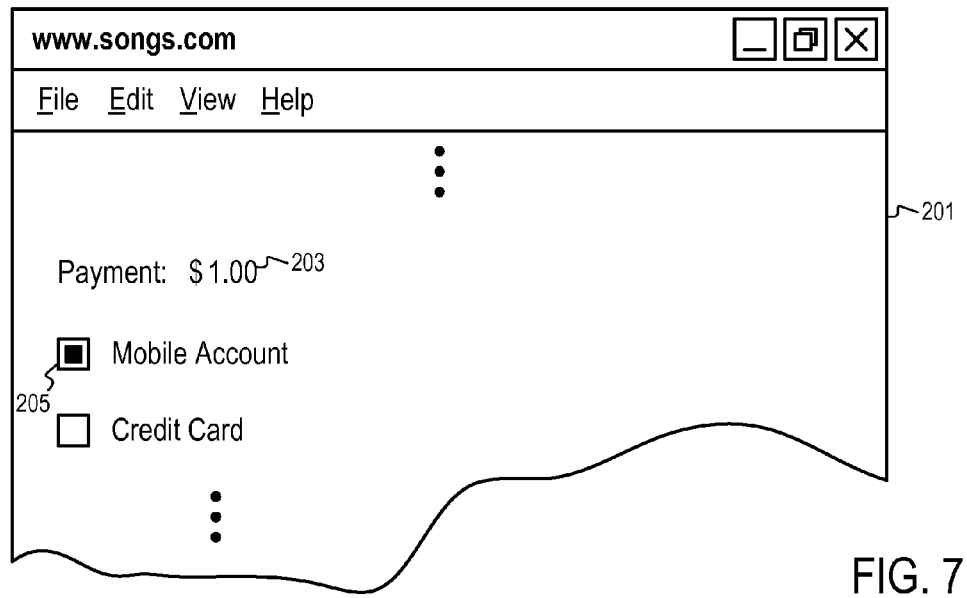
FIG. 7 illustrates a user interface to initiate a payment transaction according to one embodiment.

FIG. 7 illustrates a user interface to initiate a payment transaction according to one embodiment. In FIG. 7, the user interface (201) provides an option (205) to request the interchange (101) to process the payment for the amount (203) required to make a purchase in the server (113) of a merchant.

In one embodiment, after the user selects the payment option (205), the server (113) directs the request to the web server of the interchange (101), with a set of parameters to indicate the amount (203), the identity of the merchant, a reference to the purchase, etc. Thus, the user does not have to provide any personal information to the server (113) of the merchant to complete the payment process.

In one embodiment, the server (113) presents the payment option (205) via an online shopping cart system or a third party checkout system. Alternatively or in combination, the server (113) presents the payment option (205) via a web widget. For example, a web widget may include a program code that is portable and executable within a web page without requiring additional compilation. The web widget allows the user to select the option (205) to pay for the product and/or service without leaving the web page or refreshing the web page. In one embodiment, the interchange (101) provides the web widget to facilitate the payment processing.

Figure 8:
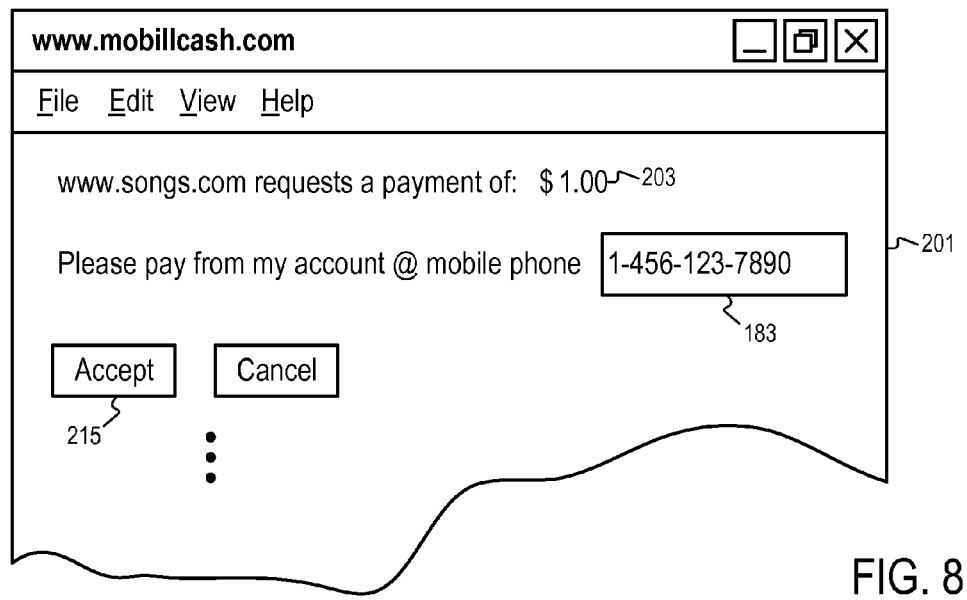
FIG. 8 illustrates a user interface to initiate a payment request according to one embodiment.

FIG. 8 illustrates a user interface to initiate a payment request according to one embodiment, after the payment request is redirected to the web site of the interchange (101). In FIG. 8, the user interface (201) includes the identity of the merchant and the amount (203) of the requested payment. The user interface (201) includes a text field (183) to allow the user to provide the phone number (123) to identify the account (121).

In other embodiments, the user interface (201) may request a PIN for enhanced security. For example, the user may be required to register with the interchange (101) prior to using the services of the interchange (101); and after registering with the interchange (101), the user is provided with the PIN or can created a customized PIN to access the functionality provided by the user interface (201). User authentication may be used to reduce false messages to the phone number (123).

Alternatively, the user interface (201) may request an identifier of the account (121) to initiate the payment transaction. In some embodiments, the user interface (201) requires the user to provide no information other than the phone number (123) in the text field (183) to initiate the transaction.

In one embodiment, once the user selects the "accept" button (205), the interchange (101) transmits a confirmation message to the mobile phone (117) according to the phone number (123) provided in the text field (183).

Figure 9:
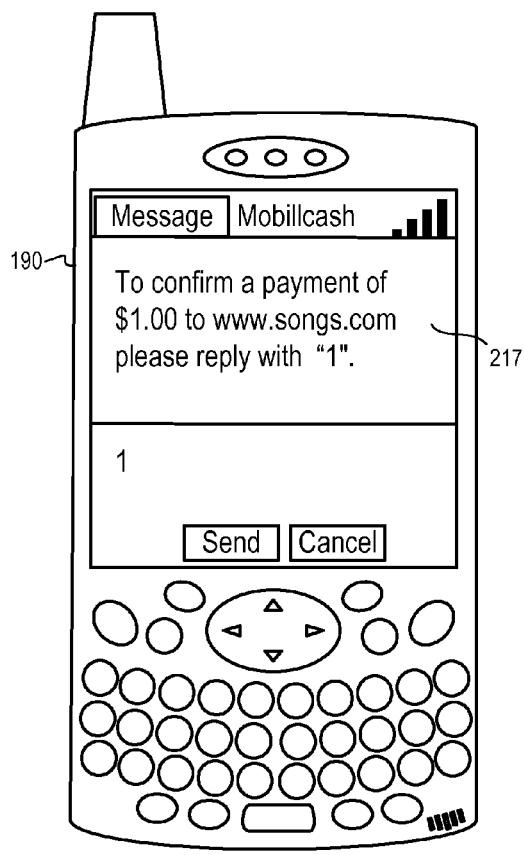
FIG. 9 illustrates a user interface to confirm a payment request according to one embodiment.

FIG. 9 illustrates a user interface to confirm a payment request according to one embodiment. In FIG. 9, the confirmation message (217) includes the amount (203) of the requested payment and the identity of the payee (e.g., a merchant operating the server (113)).

In one embodiment, the confirmation message (217) includes the instruction to reply with a code, such as a code provided in the confirmation message (217) as illustrated in FIG. 9. Alternatively, the requested code may include a PIN associated with the account (121), and/or a code (not shown) randomly generated and presented in the user interface used to initiate the payment transaction (e.g., user interface (201)). Alternatively, a secret code representing the payment request may be provided in the confirmation message (217); and the user may approve the payment transaction providing the secret code back to the interchange (101) via replying from the mobile phone (117) where the user receives the secret code, and/or replying from the user terminal (111) where the user submits the payment request.

After the correct reply is received, the interchange (101) pays the payee using the funds from the account (121) and notifies the user when the payment transaction is complete.

Figure 10:
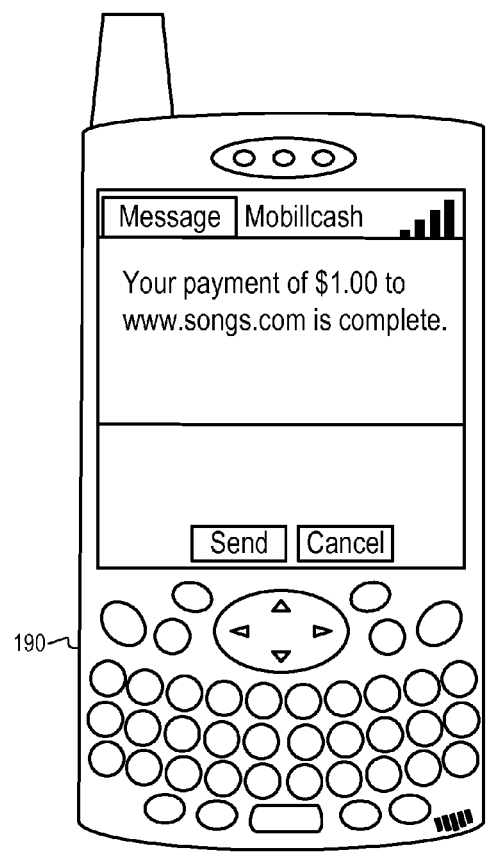
FIG. 10 illustrates a user interface to confirm the completion of a payment transaction according to one embodiment.

For example, the interchange (101) may notify the user via a text message to the mobile phone (117), as illustrated in FIG. 10. FIG. 10 illustrates a user interface to confirm the completion of a payment transaction according to one embodiment. No reply to the message that confirms the completion of the payment transaction is necessary. Once the payment transaction is complete, the user would have access to the product purchased via the payment transaction.

In one embodiment, the server (113) offers products and/or services adapted for a virtual world environment, such as an online game environment, a virtual reality environment, etc. The products may be virtual goods, which can be delivered via the transmission of data or information (without having to physically deliver an object to the user). For example, the virtual goods may be a song, a piece of music, a video clip, an article, a computer program, a decorative item for an avatar, a piece of virtual land in a virtual world, a virtual object in a virtual reality world, etc. For example, an online game environment hosted on a server (113) may sell services and products via points or virtual currency, which may be consumed by the user while engaging in a game session. For example, a virtual reality world hosted on a server (113) may have a virtual currency, which may be used by the residents of the virtual reality world to conduct virtual commerce within the virtual reality world (e.g., buy virtual lands, virtual stocks, virtual objects, services provided in the virtual reality world, etc). In other embodiments, the server (113) may also offer physical goods, such as books, compact discs, photo prints, postcards, etc.

In one embodiment, the interchange (101) stores an address of the user associated with the phone number (123). After the completion of the payment transaction, the interchange (101) provides the address to the server (113) of the merchant for the delivery of the purchased product. In some embodiments, the user may provide multiple addresses associated with the phone number (123) and may select one as a delivery address in the confirmation/approve message to the interchange (101). Alternatively, the interchange (101) may receive an address for product delivery from the mobile phone (117) together with the confirmation/approve message and then forward the address to the server (113) of the merchant. Thus, the shipping address of the transaction is verified to be associated with the mobile phone (117). In alternative embodiments, the user may directly provide the shipping address in the website hosted on the server (113) of the merchant.

In other embodiments, the user is provided with the options to pay via the mobile phone bill associated with the phone number (123). The interchange (101) may dynamically calculate a set of premium messages, based on a set of limited number of predetermined prices for premium messages, to match the purchase price. The interchange (101) sends the set of premium messages to the mobile phone (117) at the phone number (123) to collect the funds via the telecommunication carriers to pay for the purchases. Thus, the purchase prices are not limited to the set of predetermined prices for premium messages. In some embodiments, the interchange (101) may send the set of premium messages in a period of time (e.g., a week, a month, a number of mouths, etc.) to spread the payments over the period of time (e.g., to overcome budget limits and/or limits imposed by regulations).

Figure 11:
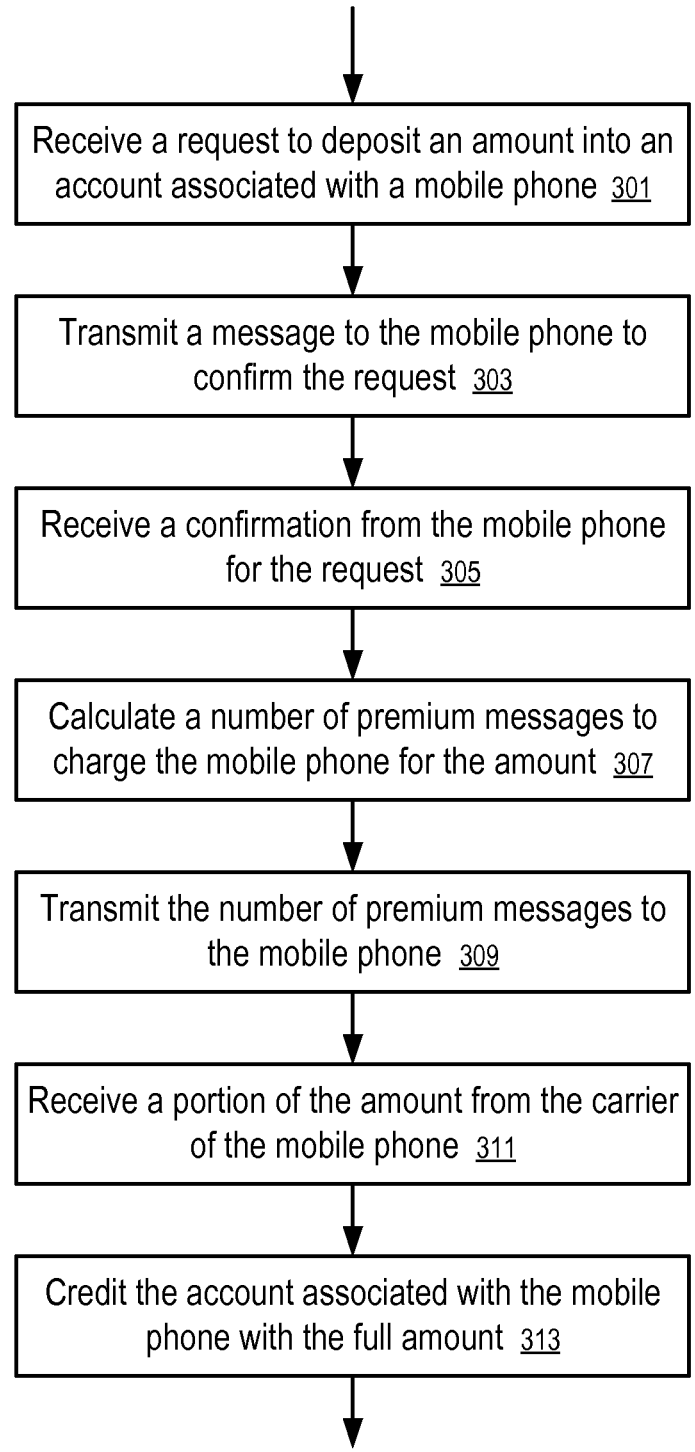
FIG. 11 shows a method to facilitate a deposit transaction according to one embodiment.

FIG. 11 shows a method to facilitate a deposit transaction according to one embodiment. In FIG. 11, the interchange (101) receives (301) a request (171) to deposit an amount into an account (121) associated with a mobile phone (117). In response, the interchange (101) transmits (303) a message (191) to the mobile phone (117) to confirm (173) the request. After receiving (305) a confirmation from the mobile phone (117) for the request, the interchange (101) calculates (307) a number of premium messages to be sent to the mobile phone (117) for the amount and transmits (309) the number of premium messages to the mobile phone (117). Alternatively, the interchange (101) may include an instruction in the confirmation message to request the user to send premium SMS messages to the interchange (101).

After receiving (311) a portion of the amount from the carrier of the mobile phone (117), the interchange (101) may credit (313) the account associated with the mobile phone (117) with the full amount (or an amount larger than the portion received from the carrier, or even an amount larger than what the user is charged via the phone bill). The carrier may keep a portion of the amount as fees for the services provided by the carrier in processing the premium message.

Alternatively, the interchange (101) may credit the same amount as the portion received from the carrier, and deduct the portion that was taken by the carrier as a fee for collecting the funds via the phone bill.

Figure 12:
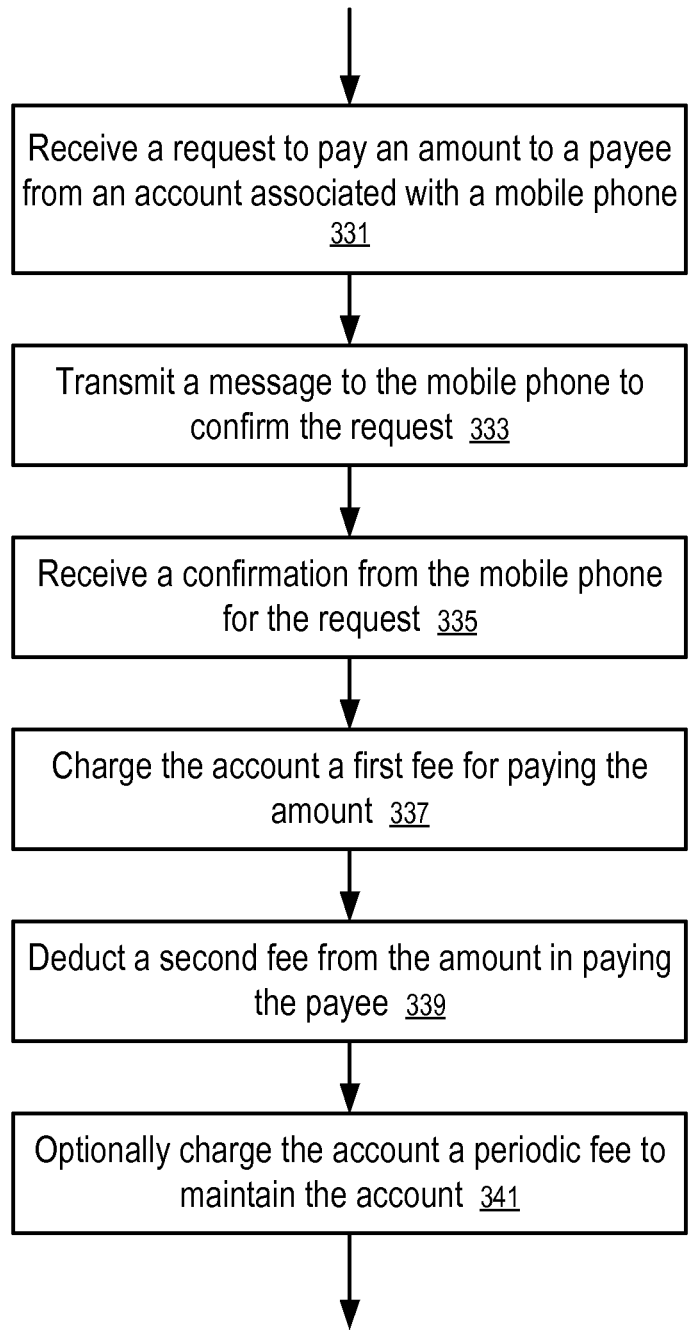
FIG. 12 shows a method to facilitate a payment transaction according to one embodiment.

FIG. 12 shows a method to facilitate a payment transaction according to one embodiment. In FIG. 12, the interchange (101) receives (331) a request to pay an amount to a payee from an account (121) associated with a mobile phone (117). In response, the interchange (101) transmits (333) a message (217) to the mobile phone (117) to confirm the request. After receiving (335) a confirmation from the mobile phone (117) for the request, the interchange (101) charges (337) the account a first fee for paying the amount and deducts (339) a second fee from the amount in paying the payee. Optionally, the interchange (101) may further charge (341) the account (121) a periodic fee to maintain the account (121), such as a monthly fee.

In one embodiment, the merchant may specify the second fee. Different merchants may offer different percentages of the purchase prices as the second fee; and the interchange (101) may calculate the first fee based on the second fee offered by the merchant, by deducting the second fee from the fees charged by the telecommunication carrier for collecting the funds via the mobile phone bill associated with the telephone number (123) and/or the fees charged by the interchange (101) for processing the payments. Since the first fee is charged to the customer (e.g., the purchaser of products and services), the cost to the customer can vary based on the selection of the merchant. For the same purchase prices, the first fee (and thus the cost to the customer) may be different for purchases made via different merchants, because the merchants may offer different percentages of the purchase price as the second fee. In some embodiments, the first and second fees include both fees charged by the telecommunication carrier for collecting the funds via the mobile phone bill/account associated with the phone number (123) and the fees charged by the interchange (101) for processing the payments. In some embodiments, the first fee includes the fees charged by the telecommunication carrier but no fees charged by the interchange (101). In some embodiments, the second fee includes the fees charged by the telecommunication carrier but no fees charged by the interchange (101). In some embodiments, the first fee and/or the second fee do not include the fees charged by the telecommunication carrier. In some embodiments, the first fee is not charged; and in other embodiments, the second fee is not charged.

In one embodiment, the interchange (101) allows the user to schedule transactions, such as recurring payments. Based on the schedule, the interchange (101) can initiate the collection of funds into the accounts (121) in advance (e.g., via sending premium messages to the mobile phone (117) at the phone number (123). After the funds are collected in the accounts (121), the transactions can be closed substantially in real time, as the interchange (101) initiates the transactions. Using the funds from the account (121), the interchange (101) does not have to wait for the telecommunication carrier of the mobile phone (117) to charge the user (e.g., via a monthly bill) and then provide the funds to the interchange (101). The interchange (101) can provide a confirmation message to the mobile phone (117) on the date the transaction is scheduled; and as soon as the interchange (101) receives a confirmation via the mobile phone (117), the interchange (101) can close the transaction using the account (121) (e.g., on the same day). Thus, the user confirmation via the mobile phone (117) to confirm the transaction is substantially the real time authentication to manage the bill payments.

In one embodiment, the interchange (101) allows the user to pay for a yearly subscription by contributing monthly to the account (121) via the mobile phone (117). The interchange (101) may pay the corresponding payee monthly for the user's yearly subscription (or at the end of the year). In some embodiments, the interchange (101) is used to schedule monthly payments for the subscription for a year; and at the end of the year, the user is offered the opportunity to extend the service for another year. In some embodiments, the interchange (101) is used to schedule a payment on a date marked on a calendar; and at the time of the payment, the user is offered the opportunity to make the same payment in a predetermined time period from the current payment (e.g., a week, two weeks, a month, a year, etc.).

For example, the users may use the interchange (101) to pay for small bills that are, or can be, periodic—monthly, weekly, etc. The interchange (101) may let the user to choose a recurring option when they make their first purchase and, maybe, even offer them a discount. For example, at the time a gamer uses the interchange (101) to pay $10 for 100 tokens from a server (113) of a game website, the interchange (101) can offer the gamer to schedule an automatic $10 purchase per month for 120 tokens from a server (113). The gamer may be further offered the opportunity to cancel or skip the monthly purchase whenever he wants.

In some embodiments, the user may schedule payments based on calendar events. The user may schedule the collections of funds in anticipation of future transactions (e.g., monthly payments, or purchases).

In some embodiments, the user may opt in or opt out. For example, after a user makes a certain type of payment or purchase, the interchange (101) may automatically schedule monthly transactions to make similar payments or purchases (e.g., monthly, weekly, or yearly). The user may opt out of such a schedule entirely, or reject some or all of the scheduled transactions (e.g., by not providing a confirmation for each of the transactions). In some embodiments, after the user rejects a predetermined number of successive recurring instances of a scheduled transaction, the interchange (101) cancels the schedule. Alternatively, at the first payment, the interchange (101) offers the user the opportunity to schedule a recurring transaction based on the current transaction.

Figure 13:
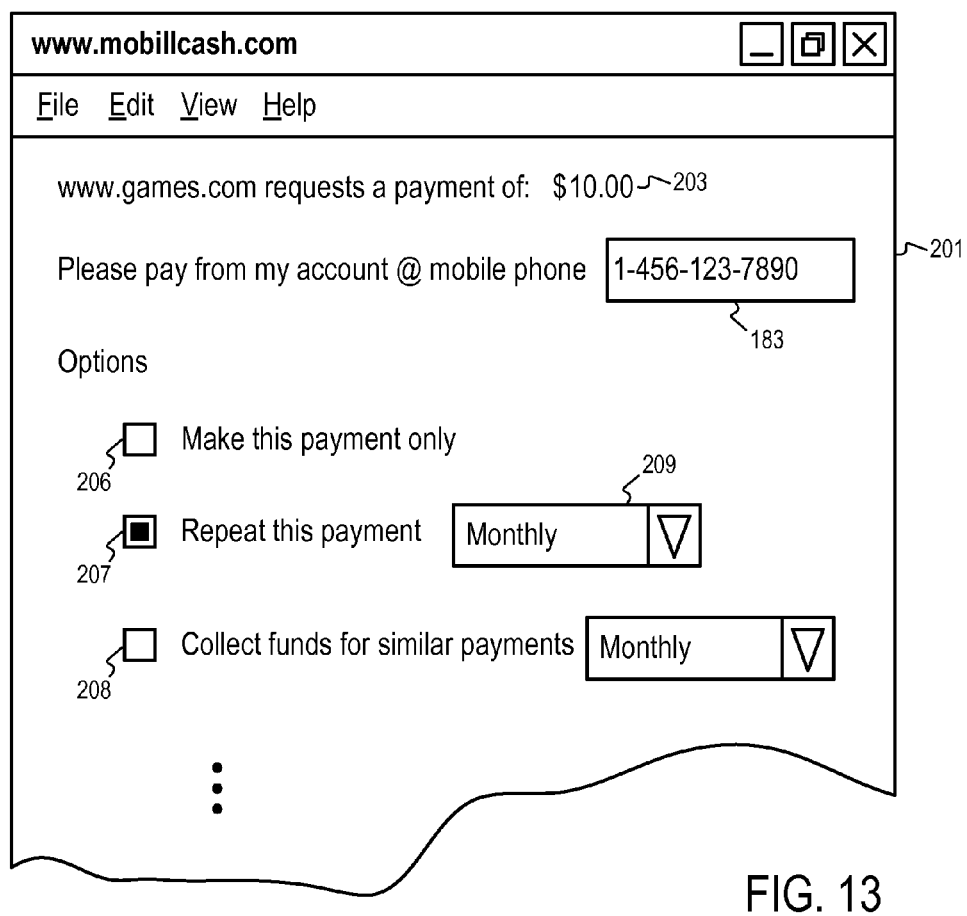
FIG. 13 shows a user interface to schedule a future transaction during the web confirmation of a current transaction according to one embodiment.

FIG. 13 shows a user interface to schedule a future transaction during the web confirmation of a current transaction according to one embodiment. In FIG. 13, the user interface (201) is presented by a web server of the interchange (101) when the user makes a purchase on a server (113). The user interface (201) prompts the user to provide the phone number (123) in the entry box (183) to identify the mobile phone (117) through which the payment is to be confirmed and/or funded.

In FIG. 13, the interface (201) provides the option (206) to make the payment for the particular purchase only. Alternatively, the user may select the option (207) to schedule a recurring transaction that is to be repeated after the time period specified via the selection box (209). In some embodiments, the user may further specify the number of times the transaction will be repeated.

In some embodiments, the user may specify a date on a calendar for the next transaction; and the user will be prompted to decide whether to further repeat the payment on the date specified on the calendar when the user is prompted to confirm the transaction on the date specified on the calendar.

When the user selects the option (207), the interchange (101) records parameters to initiate the repeated purchase with the server (113) on behalf of the user on the scheduled date for the next payment. In some instances, the interchange (101) records the identity of the user of the server (113); and the identity of the user of the server (113) may be sufficient to communicate to the server (113) the products and/or services purchased by the user. For example, the user may make the payment as a monthly fee to access the service of the server (113), or make the payment to obtain credits, points, virtual money, etc. that can be used to redeem premium services and/or products from the server (113).

In some embodiments, the server (113) and/or the interchange (101) may provide discounts for the scheduled transactions (e.g., transactions scheduled before a predetermined number of days). For example, the server (113) may offer a percentage of discounts for monthly fees paid via the schedules maintained on the interchange (101). For example, the server (113) may offer bonus credits, points, virtual money, etc., for scheduled purchases made via the interchange (101). In some embodiments, the interchange (101) offers a discount in the fees for processing the transactions, such that the server (113) may obtain the regular revenue from the purchase without offering a discount, or bonus credits, points, virtual money, etc. In some embodiments, the interchange (101) and the server (113) may share the cost to offer the discount or incentive for the scheduled transactions.

In some embodiments, the interchange (101) further records the parameters that represent the products and/or services purchased by the user. Thus, the parameters can be used by the interchange (101) on the scheduled dates to make the same or similar purchases on behalf of the user.

In FIG. 13, the user may select the option (208) to request the interchange (101) to collect funds into the account (121) for similar payments. However, the interchange (101) would not initiate the purchase or payment transaction on behalf of the user. The interchange (101) prepares the funds (e.g., according to the amount (203)) in anticipation of a similar payment and/or transaction that will be made by the user. The user may use the funds to make a purchase from a different vendor, or to make a payment to a different payee.

In one embodiment, the account (121) associated with the phone number (123) can be used to quickly settle a transaction with little or almost no delay. For example, an electronic payment can be made using the funds from the account (121) almost immediately after the interchange (101) initiates the payment process. However, funds collected via other accounts associated with the phone number (123) may take much longer. For example, it may take nearly a month to collect funds through the phone bill at the phone number (123) (e.g., collected via sending premium messages to the mobile phone (117), or via receiving premium messages from the mobile phone (117), or via operator bill). When the payment or the intended payment is scheduled on the interchange (101), the interchange (101) can start the fund collecting process ahead of the anticipated payment to allow the payment to settle on the scheduled dates without further delay. Without the schedule, the interchange (101) may have to postpone sending the notification of the payment completion to the server (113) until the funds are collected and transferred to the server (113) (or the interchange (101) may have to extend credits to the user for the time period between when the interchange (101) uses its own funds to close the payment transaction and when the interchange (101) obtains the corresponding funds from the user, or asks the server (113) to extend credits to the user).

Thus, scheduling the transactions with the interchange (101) allows the interchange (101) to start collecting the funds into the account (121) before the transaction and allows the user to make the payment substantially in real time for the scheduled payments or purchases.

In some embodiments, after the user submits the phone number (123) and the selected payment option (e.g., 207) via the user interface (201), the user is provided with a code (e.g., a one-time code) which can be submitted from the mobile phone (117) at the phone number (123) to confirm the request.

Alternatively, after receiving the request via the user interface (201), the interchange (101) sends a message to the mobile phone (117) at the phone number (123) and requests the user to confirm the request via the mobile phone (117).

In FIG. 13, the user interface (201) provides the options to schedule a future purchase or payment when the user uses the user terminal (111) (e.g., using a web browser) to access the server (113) or make a payment or purchase on the server (113). In other embodiments, the user is offered similar options when the interchange (101) transmits a confirmation message to the mobile phone (117) at the phone number (123), as illustrated in FIG. 14.

Figure 14:
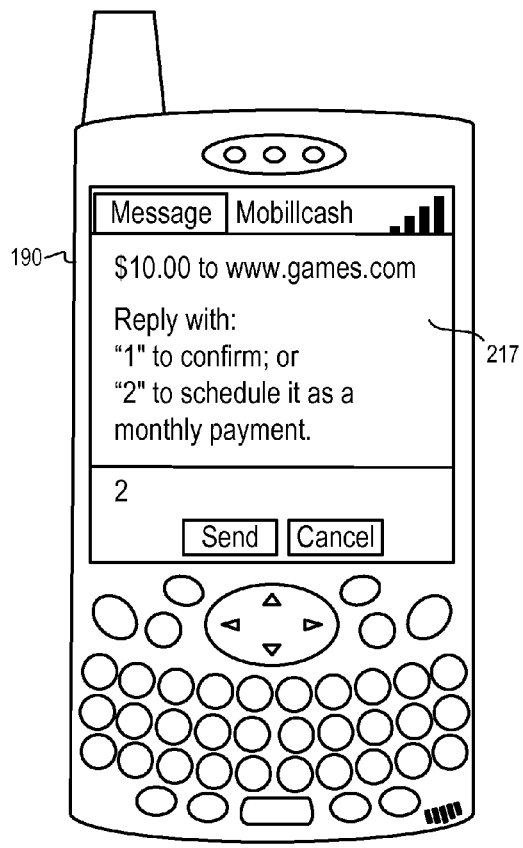
FIG. 14 shows a user interface to schedule a future transaction during the mobile phone confirmation of a current transaction according to one embodiment.

FIG. 14 shows a user interface to schedule a future transaction during the mobile phone confirmation of a current transaction according to one embodiment. In FIG. 14, the user interface (190) is presented via the mobile phone (117) at the phone number (123) when the interchange (101) transmits a message (217) to the mobile phone (117) to confirm a transaction.

In FIG. 14, the user may reply to the message (217) with the code "1" to confirm the payment of $10.00 to www.games.com, or reply to the message (217) with the code "2" to confirm the payment of $10.00 to www.games.com and further schedule a monthly payment of $10.00 to www.games.com, starting a month from the current payment. If the user does not want to complete the payment of $10.00 to www.games.com, the user may choose to ignore the message (217). In some embodiments, the user may reply to the message (217) with a special code (e.g., "99") to report an attempted misuse of the user's phone number (123) for payment.

In one embodiment, the user may specify the time period for the recurring payment/transaction. For example, the user may reply with "2 m" to schedule the payment as a monthly payment, or "2 w" as a weekly payment. In one embodiment, the user may specify the date for repeating the transaction. For example, the user may reply with "2 6/15" to schedule the next payment on June 15. For example, the user may reply with "2 6/15 m 5" to schedule five monthly payments starting on June 15.

In some embodiments, the user may also request the interchange (101) to schedule fund collections without initiating the payment or purchases on behalf of the user. For example, the user may reply with "3 7/21" to request the interchange (101) to schedule the collection of $10.00, the same amount as the current transaction, for an anticipated payment or purchase. However, the user may or may not actually initiate the payment or purchase; and the user may not use the funds to make a purchase from the same payee (e.g., www.games.com as in the example illustrated in FIG. 14).

In some embodiments, the user interface (190) may further provide a code (not shown in FIG. 14) (e.g., a one-time code)

in the message (217). Using the one-time code, the user may confirm the transaction by using a web browser (e.g., on the user terminal (111)) to visit a web server of the interchange (101), without having to reply to the message (217) using the mobile phone (117).

In one embodiment, after a transaction is scheduled on the interchange (101), the interchange (101) stores the schedule (125) on the database. On the date of the scheduled transaction (or a predetermined number of days before the scheduled transaction), the interchange (101) transmits a message to the mobile phone (117) at the phone number (123) to ask the user to confirm the transaction. Thus, the user has the opportunity to confirm the transaction, to reject the transaction, to postpone the transaction, to skip one transaction, to cancel the schedule (125), etc., as illustrated in FIG. 15.

Figure 15:
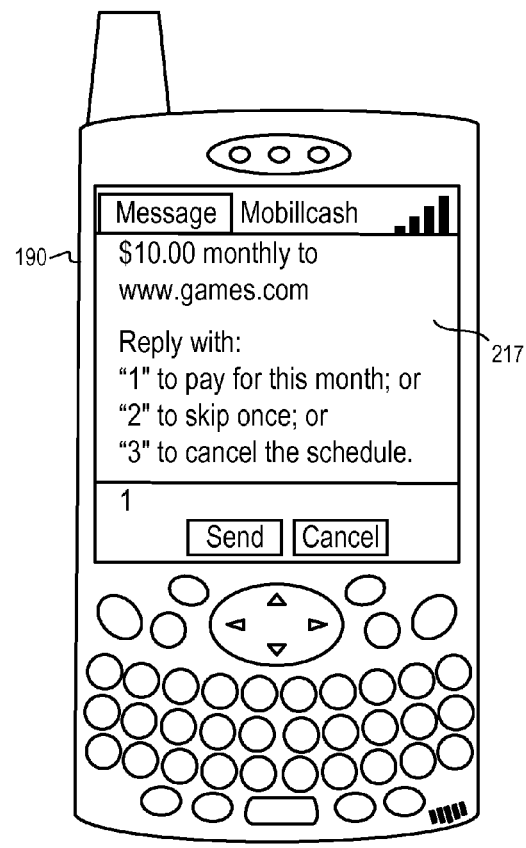
FIG. 15 shows a user interface to confirm a recurring transaction according to one embodiment.

FIG. 15 shows a user interface to confirm a recurring transaction according to one embodiment. In FIG. 15, the user interface (190) is presented via the mobile phone (117) at the phone number (123) when the interchange (101) transmits a message (217) to the mobile phone (117) to confirm a scheduled transaction.

In one embodiment, the message (217) is transmitted to the mobile phone (117) a predetermined time period prior to when the interchange (101) is scheduled to perform the transaction. If the user fails to respond to the message (217) within the predetermined time period, the interchange (101) skips the transaction. If the transaction is a recurring transaction, the current transaction will be skipped; and the next transaction is scheduled according to the time period of the recurring transaction.

In FIG. 15, the message (217) indicates a recurring (monthly) payment/purchase that will be initiated by the interchange (101) on behalf of the user of the mobile phone (117). The message (217) shows the amount of the transaction and the identity of the payee. In other embodiments, the message (217) may provide further details about the transaction, such as the products and/or services to be purchased on behalf of the user of the mobile phone (117), the discounts or incentives applied to the scheduled transaction, etc.

In some instances, the scheduled transaction is a fund collecting operation, which does not involve a payee. The funds collected are stored into the account (121) associated with the phone number (123).

In some embodiments, for a scheduled payment or purchase, the interchange (101) may provide separate messages to initiate the collection of funds and to initiate the payment or purchase. Alternatively, once the user confirms the transaction at the time of initiating the collection of funds for the transaction, the interchange (101) may not require the user to further explicitly confirm the payment or purchase at the time to initiate the payment or purchase, although the interchange (101) may provide a notification message to the mobile phone (117) (and provide the user with the opportunity to stop the payment or purchase, if the user chooses to). In other embodiments, the interchange (101) may skip the confirmation operation at the time to initiate the collection of funds and require the user to explicitly confirm the payment or purchase at the time to initiate the payment or purchase.

In FIG. 15, the user may reply to the message (217) with the code "1" to make the payment for the transaction in the current month and schedule the transaction for the next month, or with the code "2" to skip the transaction in the current month and schedule the transaction for the next month, or with the code "3" to cancel the schedule of the transaction (and thus the user will not be prompted for the transaction in the following months).

In some embodiments, the user may reply with codes to modify the schedule. For example, the user may reply with "1 10/15 m 5" to allow the interchange (101) to perform the current transaction and schedule the next five monthly transactions starting on October 15. For example, the user may reply with "2 10/15" to ask the interchange (101) to skip the current transaction and reschedule it on October 15. In some embodiments, the user may specify a different amount for the next scheduled transaction (and/or for the current transaction).

In one embodiment, the message (217) further includes a one-time code which can be used by the user on a user terminal (111) to respond to the message (217), without having to reply using the mobile phone (117). The one-time code represents the message (217); and the one-time code expires after a predetermined period of time.

Figure 16:
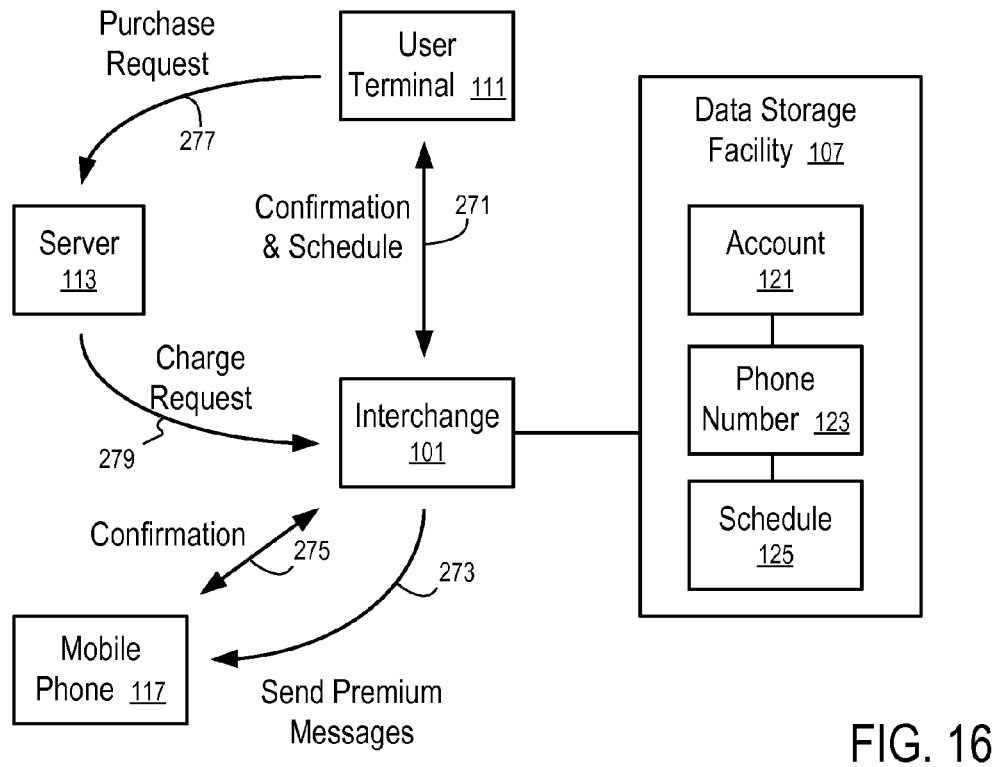
FIG. 16 shows a system to collect funds for scheduled transactions according to one embodiment.

FIG. 16 shows a system to collect funds for scheduled transactions according to one embodiment. In FIG. 16, when the user uses the user terminal (111) to make a purchase request (277) on the server (113) of a seller, the server (113) forwards the charge request (279) to the interchange (101). The interchange (101) then communicates with the user terminal (111) to confirm the current transaction and optionally schedule (271) future recurring or nonrecurring transactions with the same server (113) for the same or similar products and/or services.

If a future transaction is scheduled, the interchange (101) stores a schedule (125) in the data storage facility (107) of the interchange (101). Based on the schedule (125), the interchange (101) sends premium message (273) to the mobile phone (117) at the phone number (123) to collect the funds into the account (121) for the transactions, and communicates with the mobile phone (117) for the confirmation (275) of the transactions. For example, the interchange (101) estimates the time required to complete the collection of funds into the account (121) via sending the premium messages (273) to the mobile phone (117), and uses the estimated time and the scheduled date of the transaction to determine when to send the premium messages (273). The interchange (101) may communicate with the mobile phone (117) at the time to send the premium messages and/or at the time to perform the transaction.

Figure 17:
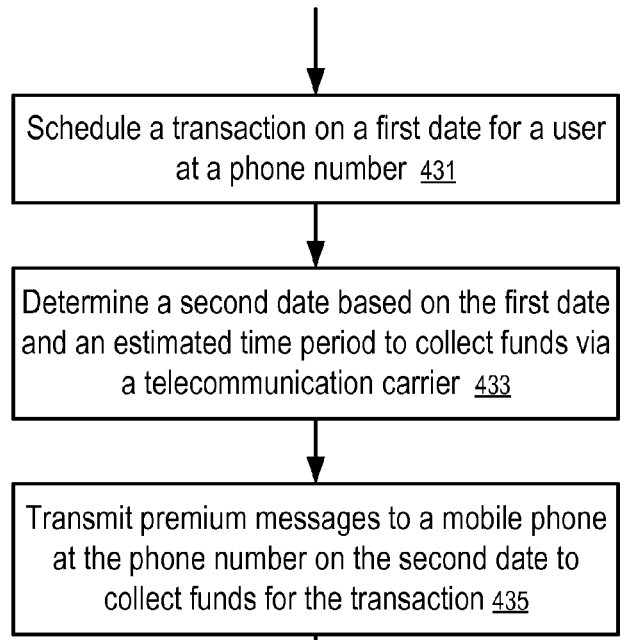
FIG. 17 shows a method to collect funds for scheduled transactions according to one embodiment.

FIG. 17 shows a method to collect funds for scheduled transactions according to one embodiment. In FIG. 17, the interchange (101) schedules (431) a transaction on a first date for a user at a phone number (123). The transaction may be a payment to a payee, or a purchase of a type of items and/or services from a seller, or a purchase of a specific item or service from a vendor.

The interchange (101) then determines (433) a second date based on the first date and an estimated time period to collect funds via the telecommunication carrier. The determination may be based on past statistical data for collecting funds from the user (or based on similar users in the same geographical area and/or with the same telecommunication carrier), the billing schedule of the telecommunication carrier, etc.

The interchange (101) then transmits (435) premium messages to a mobile phone (117) at the phone number (123) on the second date to collect funds for the transaction. The interchange (101) places the collected funds in the account (121) associated with the phone number (123) and uses the funds to complete the transaction on the scheduled date.

Figure 18:
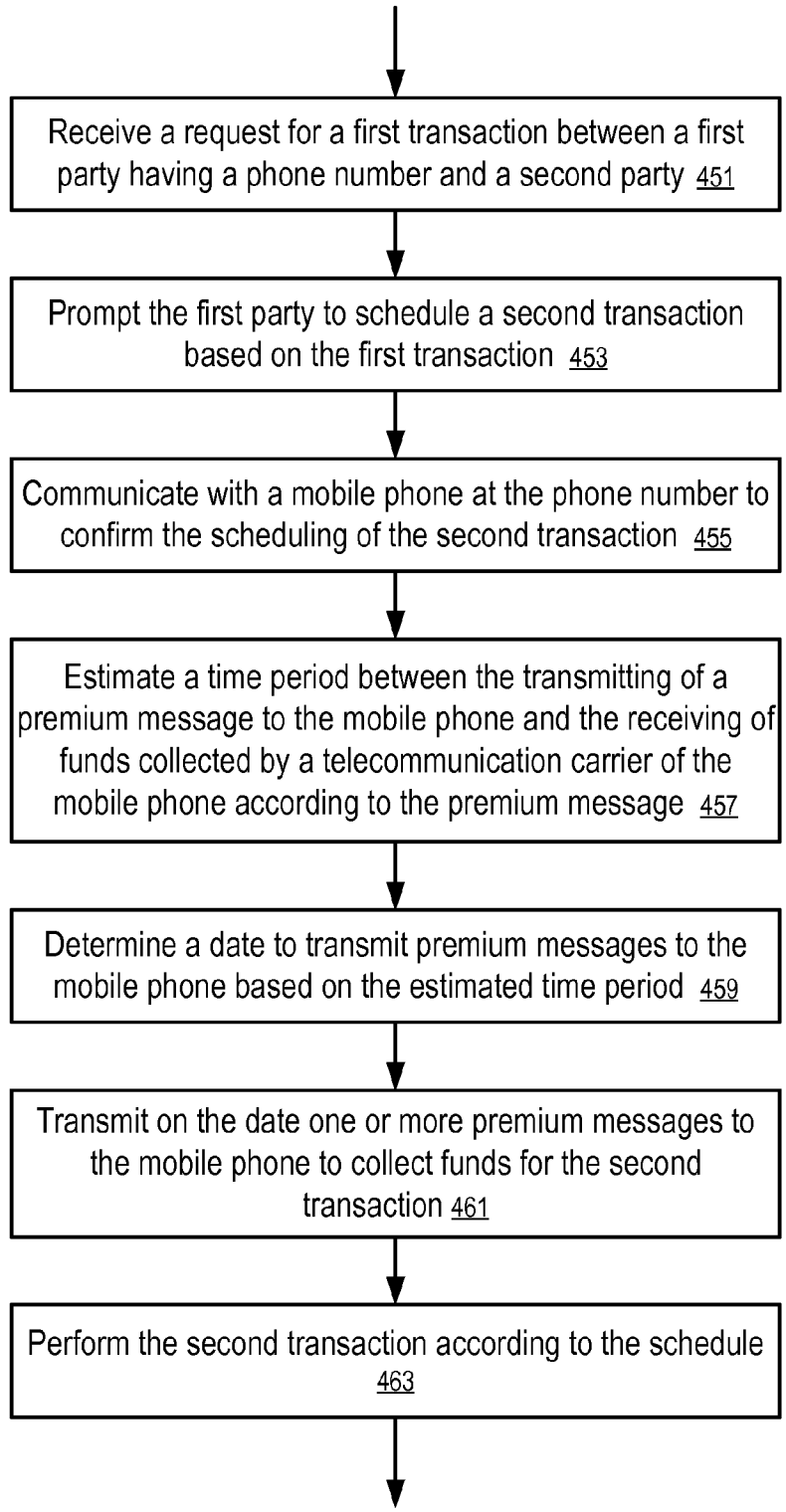
FIG. 18 shows a method to perform scheduled transactions according to one embodiment.

FIG. 18 shows a method to perform scheduled transactions according to one embodiment. In FIG. 18, the interchange (101) receives (451) a request for a first transaction between a first party having a phone number (123) and a second party, and thus prompts (453) the first party to schedule a second transaction based on the first transaction. The interchange (101) communicates (455) with a mobile phone (117) at the phone number (123) to confirm the scheduling of the second transaction.

The interchange (101) estimates (457) a time period between the transmitting of a premium message to the mobile phone (117) and the receiving of funds collected by a telecommunication carrier of the mobile phone (117) according to the premium message to determine (459) a date to transmit premium messages to the mobile phone (117).

After transmitting (461), on the date, one or more premium messages to the mobile phone (117) to collect funds into the account (121) for the second transaction, the interchange (101) performs (463) the second transaction according to the schedule using the funds collected into the account (121).

In one embodiment, the scheduled second transaction is a periodic transaction (e.g., a monthly transaction, a weekly transaction, a bi-weekly transaction, etc.). In another embodiment, the scheduled second transaction is a future transaction scheduled according to a calendar; and at the time the second transaction is confirmed/approved, the user is offered another opportunity to further schedule a future transaction on a date specified by the user.

In some embodiments, the scheduled second transaction is not a periodic transaction.

In one embodiment, prior to performing the second transaction, the interchange (101) communicates with the mobile phone (117) at the phone number (123) to confirm the second transaction on a date on which the future transaction is scheduled. Thus, the user is provided with the opportunity to skip the transaction, to postpone the transaction, to confirm the transaction and/or to schedule a new, future transaction.

In one embodiment, the interchange (101) transmits a notification to the mobile phone (117) at the phone number (123) a predetermined period of time prior to the second transaction (e.g., less than a day). The user does not have to respond to the notification to allow the interchange (101) to perform the second transaction. However, the user may optionally respond to the notification to skip or cancel the transaction, to postpone the transaction, to confirm the transaction and/or to schedule a new, future transaction.

In one embodiment, the interchange (101) communicates with the mobile phone (117) at the phone number (123) to confirm the request and to prompt the first party to schedule at least one future transaction.

In one embodiment, the amount scheduled for the second transaction is based on the amount specified in the request for the first transaction. Alternatively, the user may separately specify an amount for the second transaction, which may be different from the amount for the first transaction.

In one embodiment, the second transaction is scheduled based on a predetermined time period from the current transaction. Alternatively, the user may use a calendar to schedule the second transaction.

In one embodiment, when the interchange (101) prompts the first party to schedule the second transaction, the interchange (101) also offers a discount, or an incentive, for the second transaction scheduled with the interchange (101). The second transaction may be scheduled to pay the second party using the funds collected via the telecommunication carrier of the mobile phone (117), or scheduled without a specified payee (e.g., to merely collect funds into the account).

In one embodiment, the second transaction includes a future purchase from the second party, by the server computer of the interchange (101) on behalf of the first party. The interchange (101) may determine the future purchase based on what is purchased in the first transaction.

In one embodiment, the interchange (101) is configured to allow a user to fund the user's account (124) with the server (113) without having to go outside of the experience of the application (e.g., game, virtual reality, audio and/or visual entertainment) provided by the server (113). For example, the user may have an account (124) with the server (113) to pay for the user's activities on the server (113).

In one embodiment, the account (124) is a stored value account (or a debit account). After the user pays the server (113), the server increases an amount recorded in the account (124), in terms of a currency, a virtual currency, points, etc. The amount increased/recorded in the account (124) is proportional to the amount paid by the user.

The server (113) may provide a premium service which is charged against the account (124). For example, the server (113) may provide an online game experience and may charge the account (124) for certain actions and/or the time period the user engages in a game. For example, the server (113) may allow the user to pay for virtual goods and/or services offered in the website of the server (113). For example, the server (113) may charge the user for downloading music or video clips, for viewing articles, listening to audio streams, watching video streams, etc.

Figure 19:
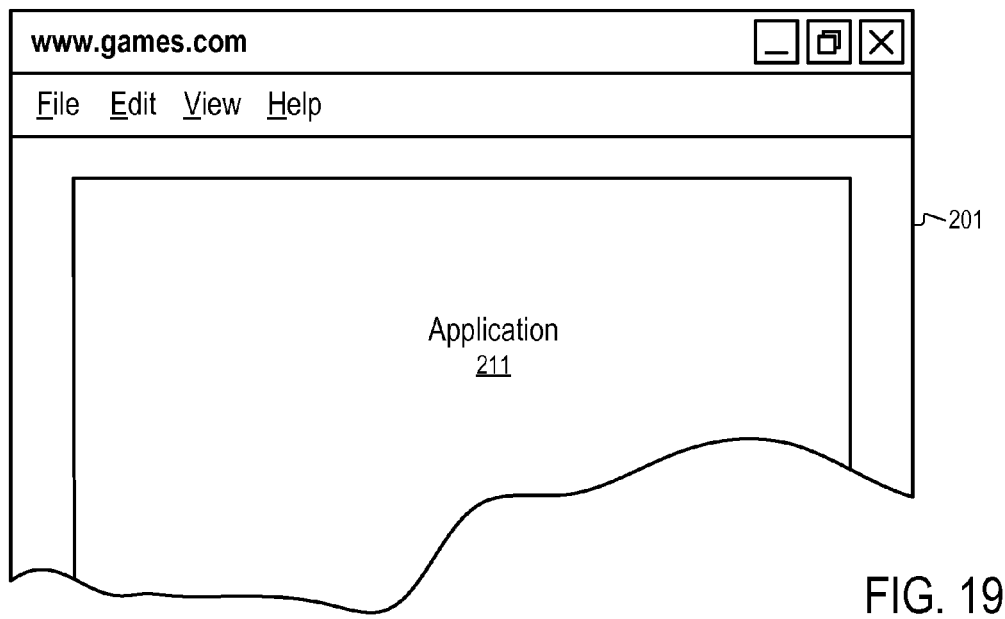
FIGS. 19-20 illustrate a user interface to add funds to an account according to one embodiment.
Figure 20:
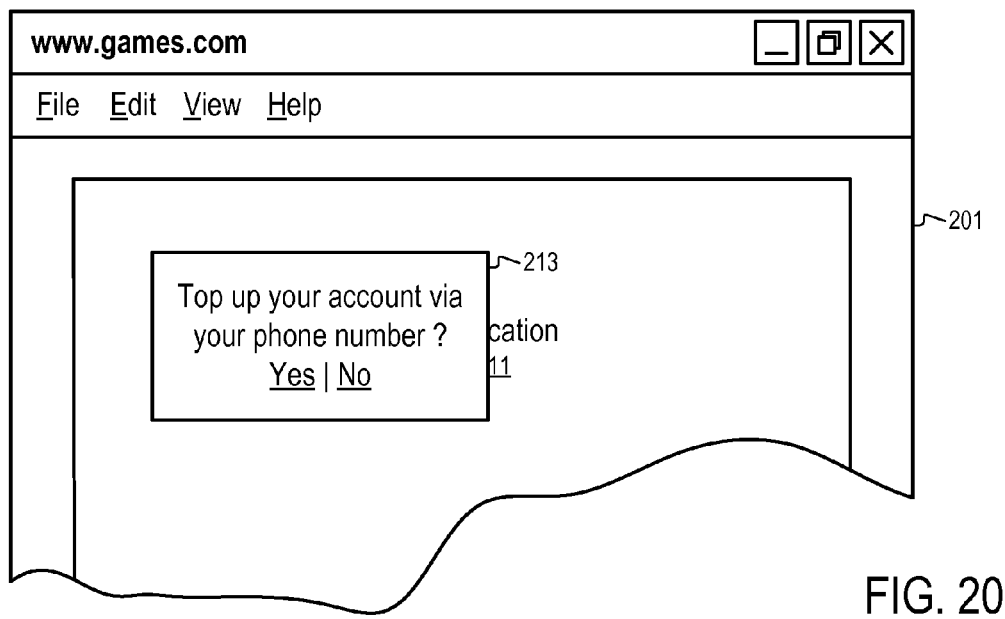

In one embodiment, the user can use the interchange (101) to add funds to, or top up, the account (124) hosted on the server (113), without having to go outside of the application provided by the server (113), as illustrated in FIGS. 19-20. Within the application (211) provided by the server (113) (e.g., a game), a user interface can be used to present advertisements to the user (e.g., to purchase an item, a subscription, a service from the server (113)) and/or to prompt the user to top up the account (124) which can be used to pay for the purchases and/or the activities of the user on the server (113).

For example, in FIG. 19, the application (211) presents the user with an experience hosted on the server (113), such as a game experience, a virtual reality experience, a communication experience, etc. When the account (124) falls below a threshold, the interface (213) as shown in FIG. 20 is presented to alert the user that the account (124) is running low and to provide the user with the option to top up the account (124). The user can select the "yes" link in the interface (213) to request the interchange (101) to top up the account (124), or the "no" link to reject the option. Thus, the user can complete the purchase to top up the account (124) without having to leave the application (211). For example, the user does not have to leave the application (211) to go to the website of the interchange (101) to complete the payment.

In one embodiment, the user interface (213) is presented via a popup window over the application (211) or a layer of the application (211) (or as part of the application (211)). In other embodiments, the user interface (213) can be presented as part of the application (211). For example, one icon (not shown in FIGS. 19 and 20) may be used to represent the account (124). When the account (124) falls below a predetermined threshold, the icon may be configured to alert the user (e.g., via sound, blinking, animation, a different color, a level indicator, etc.) The icon can be selected by the user to view the account balance and/or to request the interchange (101) to top up the account (124).

In one embodiment, the user interface (213) works alongside the application to allow users to choose to be notified when the user is running low on the account (124) and to offer the user the option to top up the account (124) via the interchange (101). If the user accepts the offer through the user interface (213) provided within the environment of the application (211), the interchange (101) charges the user via the phone number (123) to obtain funds to top up the account (124).

Figure 21:
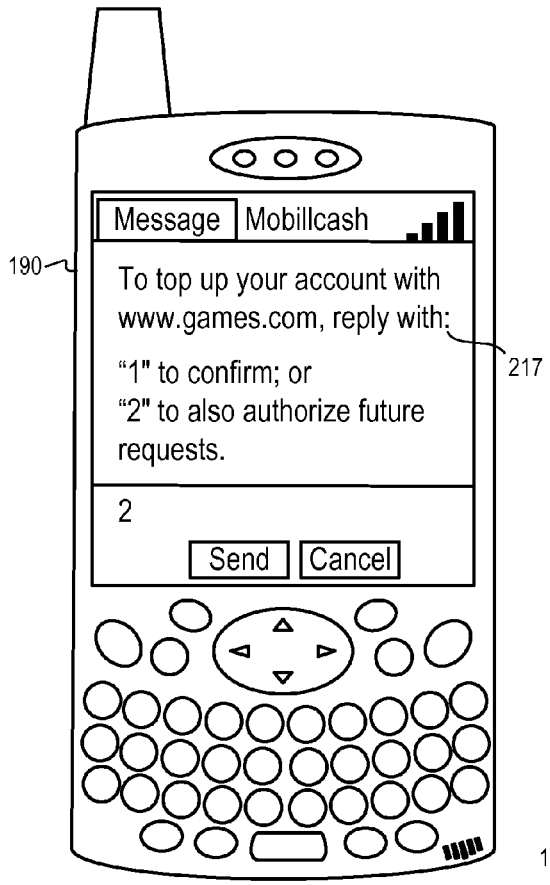
FIG. 21 illustrates a user interface on a mobile phone to obtain advance authorization to add funds to an account according to one embodiment.

In one embodiment, after the user accepts the offer, the interchange (101) communicates with the mobile phone (117) at the phone number (123) to confirm the top up request, as illustrated in FIG. 21.

In some embodiments, the user is offered the option to repeat the billing to top up the account (124) when the user is presented a message on the mobile phone (117) to confirm a top up operation. In some embodiments, after the initial communications with the mobile phone (117) to confirm the repeated billing to top up the account (124), the interchange (101) may skip the requirement to confirm with the mobile phone (117) for subsequent topping up transactions.

FIG. 21 illustrates a user interface on a mobile phone to obtain advance authorization to add funds to an account according to one embodiment. In FIG. 21, the confirmation message (217) from the interchange (101) allows the user to select option "1" to confirm only the current topping up transaction, or option "2" to not only confirm the current transaction, but also authorize future repeated topping up transactions.

In some embodiments, the user is offer the option to repeat the billing to top up the account (124) in the future (e.g., as illustrated in FIG. 21). For example, the user may schedule repeated topping up operations based on a calendar (e.g., to top up monthly or weekly), or when needed (e.g., when the amount in the account is lower below a threshold). For example, the user may request repeated topping up operations based on a threshold. When the server (113) determines that the account (124) is running low with respect to the threshold, the server (113) may automatically request the interchange (101) to repeat the billing to top up the account (or may send the request after the server (113) obtains confirmation from the user via the user interface (213)).

In some embodiments, the interchange (101) stores the user preference for repeated topping up of the account (124); and based on the user preference, the interchange (101) periodically communicates with the server (113) to determine if the account (124) needs additional funds. Alternatively, based on the user preference, the interchange (101) may request the server (113) to notify the interchange (101) when the account (124) is low.

For example, in one embodiment, if the user selects the option "2" in FIG. 21, the interchange (101) may schedule repeated topping up operations based on the balance level of the account (124). In one embodiment, after the user selects the option "2" in FIG. 21, the interchange (101) stores the authorization of the user and does not require the user to further individually confirm, via the mobile phone (117), the future instances of the topping up of the account (124).

In some embodiments, the message (217) in FIG. 21 may provide other options not shown in FIG. 21, such as an option to confirm the current topping up transaction but not schedule repeated topping up transactions based on account level, an option to confirm the current topping up transaction and schedule a future topping up transaction on a calendar, an option to confirm the current topping up transaction and request the transaction to be repeated when the account balance is lower than a user specified threshold, etc.

In some embodiments, the funds are applied to increase the level of the account (124) to a maximum level (e.g., as specified by the user preference, or by the limitation of the server (113). In some embodiment, the funds are applied to increase the level of the account (124) above a preferred level (e.g., identified by the user according to a user preference). Thus, the user does not have to specify the amount to be used for the current operation. The interchange (101) calculates the amount based on the preferences and/or the limitations. In some embodiments, the interchange (101) also presents the calculated amount in the message (217).

In some embodiments, the user may also explicitly specify an amount for the current transaction, in the reply to the message (217), to increase the level of the account (124).

In one embodiment, the user is offered the option to repeat the billing to top up the account (124) in the future, as an item/service purchased from the server (113). For example, in FIG. 13, the selection box may include an option to repeat the payment when the account is low (e.g., having an amount below a threshold). When the user purchases such an item, the interchange (101) communicates with the server (113) to determine when the account (124) is low. For example, the interchange (101) may arrange to check the balance of the account (124) periodically, or to request the server (113) to report when the account (124) is low. In other embodiments, the server (113) may record such a preference of the user and initiate repeated billing requests to the interchange (101), on behalf of the user, when the account (124) is low.

Thus, the user may schedule an automatic purchase based on a threshold on the server (113). In some embodiments, the automatic purchase is to be confirmed on-site in the application of the server (113). After the repeated instance of the purchase is confirmed on-site on the server (113), the interchange (101) may skip the confirmation via the mobile phone (117). Instead, a notification of the repeated instance of the purchase may be sent to the mobile phone (117). In some embodiments, the notification is included in the premium message sent to the mobile phone (117) for collecting the funds.

Figure 22:
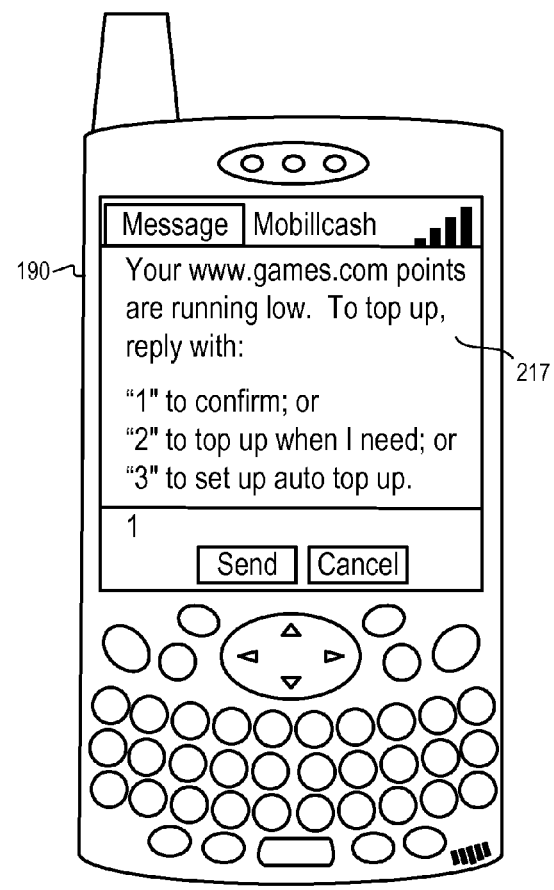
FIG. 22 illustrates a user interface on a mobile phone to add funds to an account according to one embodiment.

FIG. 22 illustrates a user interface on a mobile phone to add funds to an account according to one embodiment. In FIG. 22, the interchange (101) sends a message (217) to the mobile phone (117) to prompt the user to top up the account (124) when the account (124) is running low. The interchange (101) may send the message (217) in response to a request from the server (113), where the server (113) may or may not have obtained the authorization from the user to top up the account (124).

In FIG. 22, the message (217) includes an option "1" to confirm a one time transaction to top up the account (124). After the option "1" is selected, the interchange (101) continues to send confirmation messages to the mobile phone (117) to request confirmation for future transactions to top up the account (124).

In FIG. 22, the message (217) includes an option "2" to request repeated topping up transactions when needed by the user. After the option "2" is selected, and if the user subsequently indicates to the server (113) the need to top up the account (124) to initiate a transaction (e.g., via the user interface (213) presented in the environment of the application (211) running on the server (113)), the interchange (101) may skip the requirement for a confirmation communication via the mobile phone (117) before carrying out the transaction initiated by the user. Thus, the user does not have to provide additional inputs (via the mobile phone (117) to the interchange (101) after the user communicates the need via the user terminal (111)). To improve security, the interchange (101) may provide a notification message to the mobile phone (117) without requiring a response.

In FIG. 22, the message (217) includes an option "3" to set up an option to automatically top up the account (124) based on the level of the account (124). After the option "3" is selected, the user does not have to explicitly provide input to indicate the need to top up the account (124). The interchange (101) communicates with the server (113) to automatically determine the need and perform future transactions to top up the account (124) based on a threshold value and/or periodically. Thus, the interchange (101) may rely upon the server (113) to authenticate the user who is using the account (124) and use a notification message to the mobile phone (117) to allow the user to timely discover unauthorized uses.

In some embodiments, there may be a difference between the amount of funds used to purchase an item and the amount of available funds collected via a set of premium messages. To dispose of the difference, the user may set up a preference to top up the account (124) on the server (113) using the difference between the amount of funds used to purchase an item and the amount of available funds collected via a set of premium messages (e.g., when the user makes a purchase on a different server). Thus, funds are automatically added to the account (124) on the server (113) when the user makes purchases via the interchange (101) on different servers (113).

Figure 23:
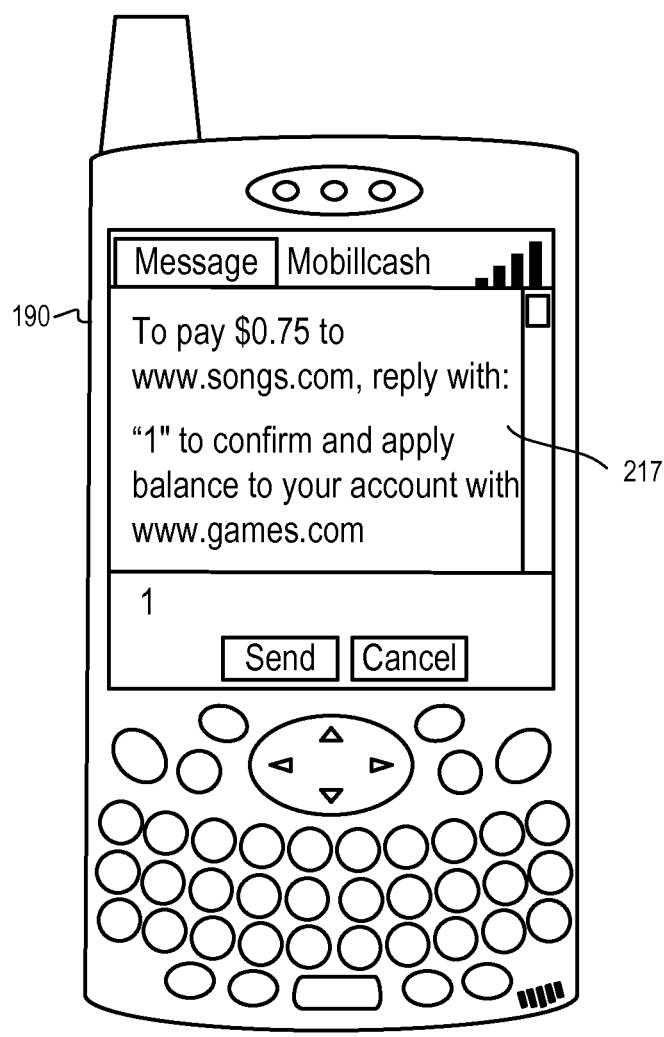
FIG. 23 illustrates a user interface on a mobile phone to top up an account according to another embodiment.

FIG. 23 illustrates a user interface on a mobile phone to top up an account according to another embodiment. In FIG. 23, the message (217) indicates that the user wants to pay $0.75 to make a purchase from www.songs.com (e.g., a song). Available funds collected via the telecommunication carrier, after a premium message is sent to the mobile phone (117), may be above the price of $0.75 requested by www.songs.com. For example, available funds may be in the amount of $0.80. In FIG. 23, if the user replies to the message (217) with "1," the user confirms the transaction and agrees to apply the difference between the available funds and the asking price (e.g., $0.80−$0.75=$0.05) to an account (124) of the user on a different server (113) (e.g., www.games.com).

The message (217) may also include other options not shown in FIG. 23. For example, the message (217) may include an option to top up a different account using the difference between the available funds and the asking price. For example, the message (217) may include an option to keep the difference in the account (121) hosted in the data storage facility (107) of the interchange (101). For example, the message (217) may include an option to use other fund sources to pay the difference in price, such as the account (121), a credit card, a debit card, a bank account, etc.

In one embodiment, the interchange (101) stores information about the accounts (124) of the user with different servers (113), after the user uses the interchange (101) to add funds to the corresponding accounts (124). Based on the statistic of transactions related to adding funds to the corresponding accounts (124) and/or the current balance levels of the accounts (124), the interchange (101) may select one or more accounts to generate the option lists for the message (217).

For example, the interchange (101) may determine the most likely account that needs additional funds by comparing the ratios between the current balance level and the upper limit of the corresponding accounts; and the account with the highest ratio may be presented as the first option. For example, the interchange (101) may sort the accounts to determine the priority for topping up based on the frequencies in which the user adds funds to the accounts (124).

In some embodiments, the message (217) also shows the balance of the accounts (124).

In one embodiment, the user may further request the interchange (101) to budget up to a predetermined difference between the amount of funds used to purchase an item and the amount of available funds collected via a set of premium messages, to increase the amount that can be added to the account (124).

For example, in FIG. 23, the message (217) may include an option to collect an additional $0.80 to fund the account (124). Thus, the available funds collected via the premium messages will be $1.60, of which $0.75 is to pay for the purchase from www.songs.com, and the balance of $1.60−$0.75=$0.85 is to top up the account with www.games.com (if the option "1" is selected).

In some embodiments, the user may specify a suggested amount to top up the account (124). The interchange (101) determines a combination of premium messages that can provide available funds closest to the sum of the suggested amount for topping up the account (124) and the asking price of the purchase from www.songs.com.

In some embodiments, the interchange (101) generates a code to represent the difference between the price and the available funds. The code can be used for other transactions to reduce the amount of funds that need to be collected. Once the code is applied to a transaction, the code is no longer valid. In some embodiments, the code is limited to being applied using the mobile phone (117) at the phone number (123). In other embodiments, the code is transferrable; and the user may provide the code to a different user (e.g., as a gift).

Figure 24:
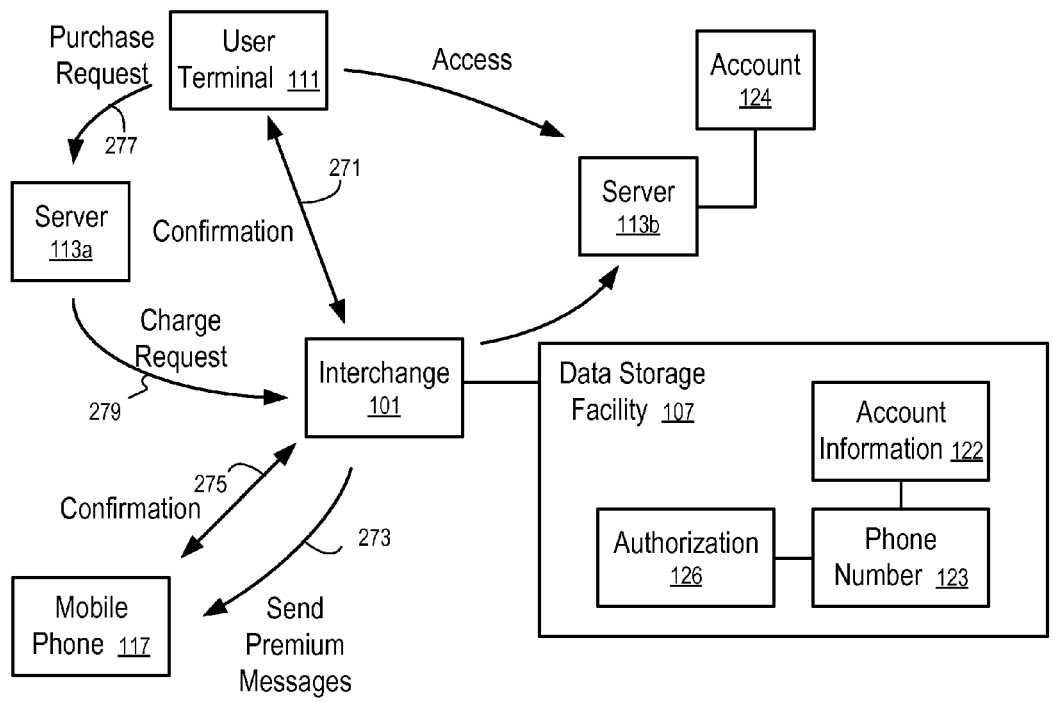
FIG. 24 illustrates a system to top up an account according to one embodiment.

FIG. 24 illustrates a system to top up an account according to one embodiment. In FIG. 24, the user may use the user terminal (111) to access different servers (e.g., 113a and 113b). The server (113) maintains an account (124) for the user (e.g., for premium services, for purchases made on the server (113), for subscription fees, etc.)

In one embodiment, when the user uses the interchange (101) to add funds to the account (124) via the phone number (123), the interchange (101) stores the account information (122) to identify the account (124) on the server (113b). The account information (122) is associated with the phone number (123) in the data storage facility (107) of the interchange (101). The interchange (101) communicates with the mobile phone (117) at the phone number (123) for the confirmation (275) of the request to add funds to the account (124); and, after the conformation (275), the interchange sends (273) premium messages to the mobile phone (117) to collect funds for the account (124).

In one embodiment, during the confirmation (275) and/or the request from the user terminal (111) to add funds to the account (124), the interchange (101) obtains the authorization (126) to subsequently add funds to the account (124) when needed.

Based on the authorization (126), the interchange (101) may communicate with the server (113b) to determine the balance level of the account (124) and identify the need to add funds to the account (124). For example, using the account information (122), the interchange (101) may periodically check with the server (113b) to determine if the account (124) needs additional funds. Alternatively, the interchange (101) may register with the server (113b) to cause the server (113b) to request additional funds for the account (124) when the balance level of the account (124) is below a threshold. In some embodiments, the server (113b) uses an in-application user interface (e.g., 213) to obtain user consent to add funds to the account (124).

In one embodiment, based on the authorization (126), the interchange (101) can skip the confirmation (275) with the mobile phone (117) when there is a need to add funds to the account (124). The interchange (101) may notify the user of the topping up operation via the premium message (273).

Further, in FIG. 24, based on the authorization (126), the interchange (101) may automatically apply the balance of a purchase transaction towards the account (124). For example, when the user uses the user terminal (111) to make a purchase request (277) on a different server (113a), the server (113a) sends or forwards the charge request (279) to the interchange (101). After the confirmation (275) with the mobile phone (117) for the purchase request (277), the interchange (101) determines a combination of premium messages (273) to collect funds for the purchase. When the collected funds exceed the payment for the purchase, the interchange (101) applies the difference between the collected funds and the payment towards the account (124). Thus, the account (124) can also be topped up in response to available funds.

Figure 25:
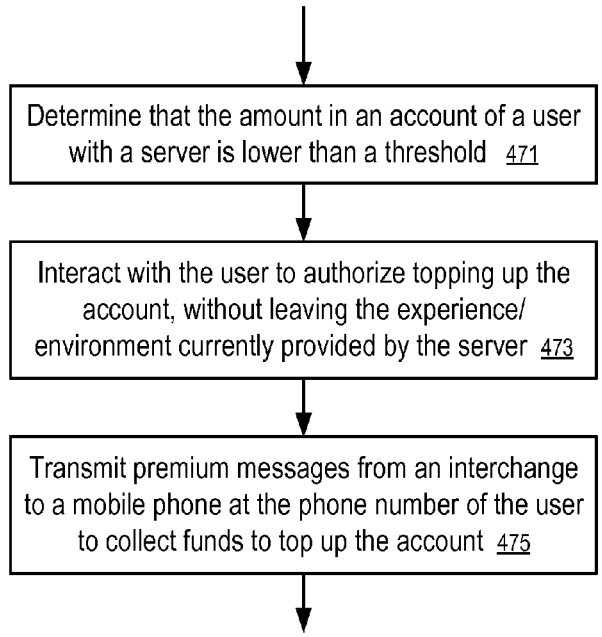
FIGS. 25-26 show methods to top up an account according to some embodiments.
Figure 26:
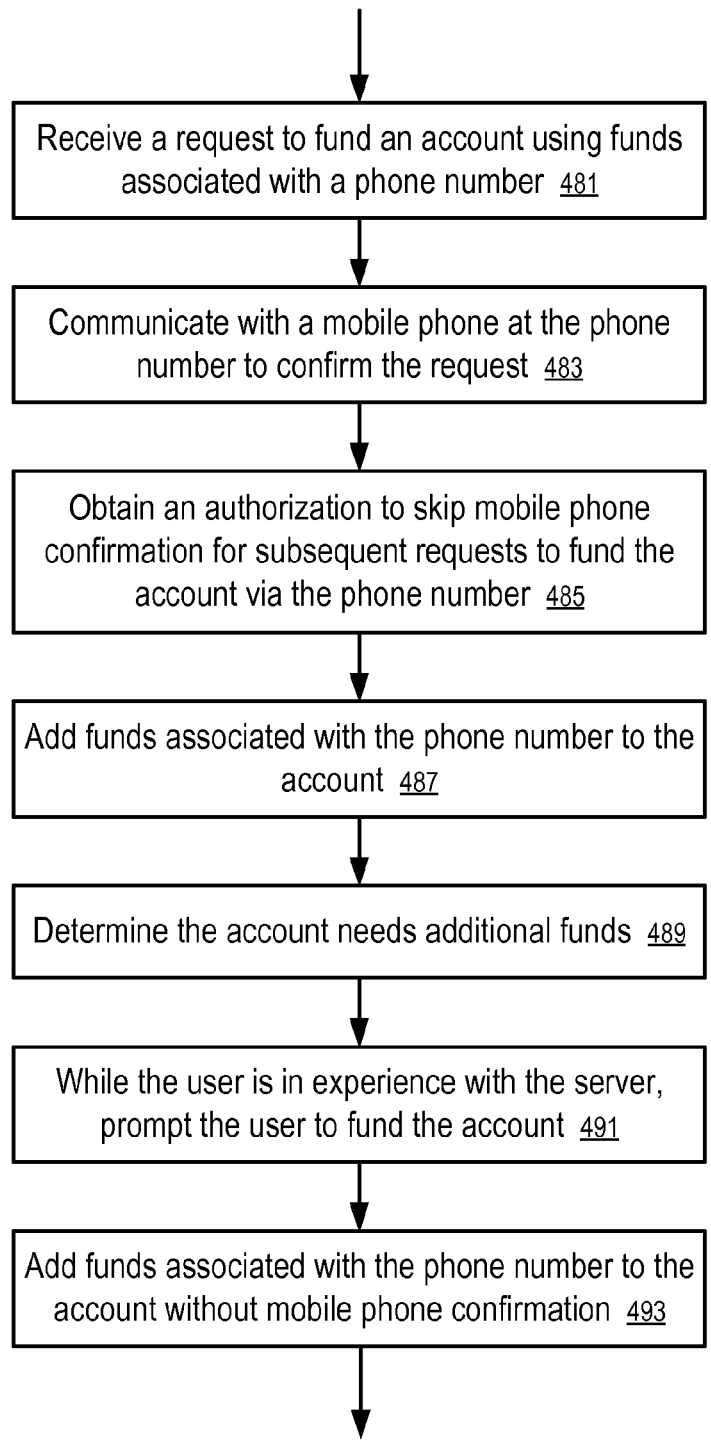

FIGS. 25-26 show methods to top up an account according to some embodiments.

In FIG. 25, after the interchange (101) (and/or the server (113)) determines (471) that the amount in an account (124) of a user with a server (113) is lower than a threshold, the interchange (101) (and/or the server (113)) interacts (473) with the user to authorize topping up the account (124), without leaving the experience/environment currently provided by the server (113). For example, in some embodiments, the interchange (101) presents the user interface (213), as illustrated in FIG. 20, to obtain the user's authorization without leaving the application (211) provided by the server (113). In other embodiments, the server (113) presents the interface (213) to obtain the user's authorization on behalf of the interchange (101). In some embodiments, the interchange (101) obtains the authorization via a message to the mobile phone (117) at the phone number (123) of the user, as illustrated in FIG. 22.

In FIG. 25, the interchange (101) transmits (475) premium messages to the mobile phone (117) at the phone number (123) of the user to collect funds to top up the account (124).

In FIG. 26, in response to receiving (481) a request to fund an account (124) using funds associated with a phone number (123), the interchange (101) communicates (483) with a mobile phone (117) at the phone number (123) to confirm the request. The interchange (101) obtains (485) an authorization to skip mobile phone confirmation for subsequent requests to fund the account (124) via the phone number (123), and then adds (487) funds associated with the phone number (123) to the account.

After obtaining the authorization, if it is determined (489) that the account (124) needs additional funds, the user is prompted (491) to fund the account (124) while the user is in an experience with the server (113). If the user agrees, the interchange (101) adds (493) funds associated with the phone number (123) to the account (124) without mobile phone confirmation.

In one embodiment, the user is prompted and then accepts an option without leaving an experience that is provided by the server (113) prior to the prompting. In one embodiment, the user accepts the option to cause the server (113) to fund the account (124), without providing further input related to the funding of the account (124).

In one embodiment, the user is authenticated by the server (113) for an online service provided by the server (113), such as game, virtual reality, etc.

In one embodiment, the interchange (101) receives a request from the server (113) when the server (113) determines that an amount in the account (124) is lower than a threshold, and then the interchange (101) tops up the amount in the account (124) to a predetermined level, such as an upper limit for the account (124).

In one embodiment, the interchange (101) stores and associates the phone number (123) with account information (122) that identifies the account (124) in a data storage facility (107) coupled with interchange (101), if the request is confirmed via the mobile phone (117).

In one embodiment, the server (113) communicates an indication of the account (124) to the interchange (101) for a request to top up the account (124); and the interchange (101) determines the phone number (123) based on data stored in the data storage facility (107) coupled with the interchange (101). In other embodiments, the server (113) identifies and communicates the phone number (123) to the interchange (101) for the request to top up the account (124).

In one embodiment, in response to a request to pay a first amount to a payee, the interchange (101) transmits one or more premium messages to a mobile phone (117) at the phone number (123) to collect a second amount via a telecommunication carrier of the mobile phone (117). The interchange (101) pays the payee the first amount from the second amount of funds collected via the one or more premium messages, and automatically funds the account (124) using the difference between the first amount and the second amount (e.g., based on a preference of the user).

In one embodiment, the interchange (101) may transmit to a mobile phone (117) at the phone number (123) one or more premium messages to collect the funds via a telecommunication carrier of the mobile phone (117), or transmit to a mobile phone (117) at the phone number (123) a message to instruct the user to send one or more premium messages to the interchange (101) to collect the funds via a telecommunication carrier of the mobile phone (117).

In other embodiments, the interchange (101) determines account information based on data stored in a data storage facility (107) coupled to the interchange (101), where the data associates a plurality of phone numbers with respective information of financial accounts of respective users. The interchange (101) uses the account information, such as a credit card number, a debit card number, or a bank account number, to collect the funds.

In one embodiment, the interchange (101) is configured to provide streamlined, simplified user experiences for repeated transactions. The request for the repeated purchase can be initiated from a mobile device, an online computer, or a point-of-sale terminal; and the interchange (101) can use various funding sources associated with a phone number to process the payment for the repeated purchase, such as premium messages, mobile billing, credit/debit card, bank accounts accessed via Automated Clearing House (ACH), etc. In one embodiment, the interchange (101) is configured to provide fast and secure processing of repeated purchases for customers who may purchase the same items multiple times.

In one embodiment, after the interchange (101) completes a payment transaction for a user of a phone number (123), the interchange (101) listens for predetermined types of events that trigger the automated process to repeat a prior purchase, such as the purchase of the item(s) associated with the most recent payment processed by the interchange (101) for the phone number (123). Example events that can trigger a repeated purchase include, but are not limited to, a predetermined keyword transmitted to a short code of the interchange (101) via SMS, a request to repeat a purchase as a response to a confirmation of a successful payment processed for a prior purchase, a request to repeat a purchase in a website of the interchange (101) presenting a prior payment transaction (e.g., as in a presentation of the transaction history of the phone number (123)), and a repeated purchase request from a merchant on behalf of the user of the phone number (123).

For example, in one embodiment, after a user of the phone number (123) initiates a purchase transaction for a product (or service) offered by a merchant, the interchange (101) processes the payment for the purchase transaction using funds associated with the phone number (123). After the interchange (101) completes the payment transaction successfully, the interchange (101) provides a message to the user of the phone number (123) so that the user can repeat the same purchase (e.g., purchase from the same merchant an item that is the same as the product previously purchased) by sending a message containing a keyword (e.g., "R") to a short code of the interchange (101) via SMS.

In one embodiment, a short code is a special telephone number, significantly shorter than full telephone numbers, that can be used to address SMS and MMS messages.

Thus, after the interchange (101) receives an SMS message containing the keyword (e.g., "R") sent from the user of the phone number (123) to the short code of the interchange (101), the interchange (101) communicates with the merchant to repeat the purchase on behalf of the user of the phone number (123), and processes a payment for the repeated purchase using funds associated with the phone number (123). Thus, the user does not have to repeat the order with the merchant; and the user does not have to separately confirm the payment using the mobile phone (117) at the phone number (123). After the repeated purchase and payment are processed successfully, the interchange (101) informs the user of the successful purchase; and the user is to receive the purchased product (or service) from the merchant.

In one embodiment, the SMS message containing the keyword (e.g., "R") does not explicitly identify the prior purchase. The interchange (101) is to repeat the purchase associated with the most recent payment transaction processed by the interchange (101) using funds associated with the phone number (123).

In one embodiment, the SMS message containing the keyword (e.g., "R") also includes an identifier of a prior successful payment transaction; and the interchange (101) is configured to initiate a new purchase in accordance with the purchase associated with the prior successful payment transaction on behalf of the user of the phone number (123).

In one embodiment, when the user requests or confirms a prior payment transaction, the user is provided with the option to authorize the merchant to automate repeated purchases on behalf of the user. If the user selects the option, the interchange (101) allows the merchant to initiate a new transaction (e.g., to repeat the purchase) without the user directly instructing the interchange (101) to make the payment for the new transaction. For example, in one embodiment, after the user selects the option, the interchange (101) is to inform the merchant of the user authorization to repeat the purchase; and if the merchant submits a payment request directly to the interchange (101), without going through the user, the interchange (101) is to process the payment request in accordance with the user authorization. If the merchant submits a payment request directly to the interchange (101) without the prior user authorization, the interchange (101) is configured to reject the payment request.

In one embodiment, after the merchant submits a payment request directly to the interchange (101) and the user has previously authorized the merchant to automate the repeated purchases, the interchange (101) is configured to transmit a confirmation message to the mobile phone (117) at the phone number (123) to request a user to confirm the new payment transaction. In one embodiment, the confirmation message includes the purchase details specified in the transaction record for the previous purchase that is currently being repeated. In another embodiment, the confirmation message includes the purchase details specified in the current payment request. In some embodiments, the authorization allows the merchant to initiate a payment request, on behalf of the user, for a purchase with a modification based on the prior purchase, or a new purchase independent from the prior purchases.

In one embodiment, the authorization for the merchant to initiate the payment request on behalf of the user allows the merchant to automate certain order placing operations and/or checkout operations. For example, the merchant may initiate the payment request to top up the user account for a game when the balance of the user account fails below a threshold. For example, the merchant may schedule automated periodic purchases for the user. For example, the merchant may offer purchase deals (e.g., with discounts, or incentives) to the user.

In one embodiment, when the payment request is initiated by the merchant on behalf of the user, the interchange (101) is configured to check whether the user has previously provided authorization for such payment requests. If the user has not yet provided such authorization, the payment request is rejected; otherwise, the interchange (101) is configured to communicate with the mobile phone (117) at the phone number (123) of the user to confirm the payment request. The authorization feature allows the interchange (101) to block offers from the merchant without prior consent from the user, which can reduce or eliminate unwanted messages that might be considered spam messages. The confirmation message transmitted to the mobile phone (117) of the phone number (123) of the user allows the user to decide whether or not to accept the merchant offers.

Figure 27:
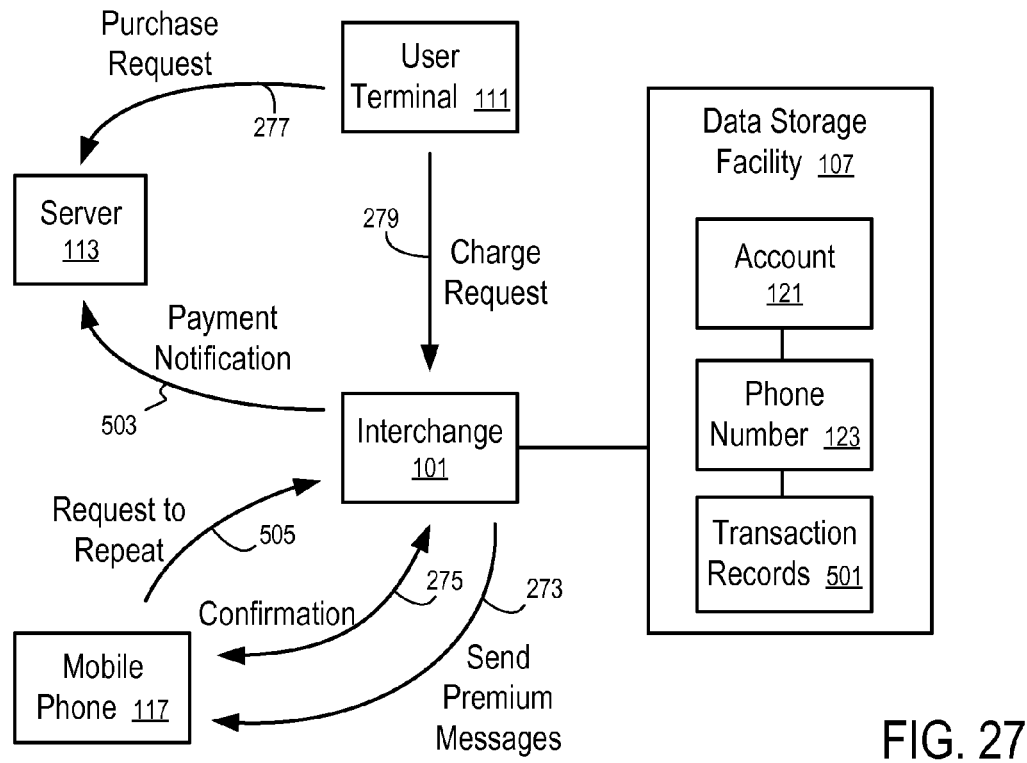
FIG. 27 shows a method to process a repeated transaction in response to a user request according to one embodiment.

FIG. 27 shows a method to process a repeated transaction in response to a user request according to one embodiment. In FIG. 27, the data storage facility (107) of the interchange (101) is configured to store transaction records (501) for payments processed using funds associated with the phone number (123).

In one embodiment, the transaction records (501) identify the respective merchants to which the payments were made. In one embodiment, the transaction records (501) further include information about purchase details, such as descriptions of items purchased, the prices and the units purchased, etc. In one embodiment, the transaction records (501) include transaction identifiers that can be used by merchants to look up the respective purchases made by the user.

In FIG. 27, the server (113) of the merchant is configured to receive a purchase request (277) from the user terminal (111) of the user of the mobile phone (117). When the user decides to make the payment for the purchase using the interchange (101), the user terminal (111) transmits the charge request (279) to the interchange (101) (e.g., using a web browser as illustrated in FIG. 8). The charge request (279) provides the phone number (123) to identify funding sources for the charge request (279). The charge request (279) also identifies the server (113) as the payee for the charge request (279).

In response to the charge request (279) received from the user terminal (111), the interchange (101) communicates with the mobile phone (117) for a confirmation (275) of the charge request (279). After the charge request (279) is confirmed, the interchange (101) sends (273) premium messages to the mobile phone (117) to collect funds for the charge request (279). After the premium messages are successfully delivered to the mobile phone (117) (e.g., as indicated by delivery notifications received from the controller (115) of the mobile phone (117)), the interchange (101) stores a transaction record (501) to record information about successful payment transaction associated with the charge request (279) and provide a payment notification (503) to the server (113) to indicate the success of the payment transaction.

In one embodiment, after the successful payment transaction is recorded in the data storage facility (107), the user can use the mobile phone (117) to make a request to repeat the purchase, without having to again send the purchase request (277) and the charge request (279).

In one embodiment, when the mobile phone (117) transmits to the interchange (101) a message to request (505) the system to repeat a purchase, the interchange (101) is configured to look up the last transaction record associated with the phone number (123) to identify the purchase to be repeated. In one embodiment, the interchange (101) is to contact the server (113) to initiate the purchase request on behalf of the user, in accordance with the last transaction record. If the server (113) indicates that the prior purchase can be repeated, the interchange (101) is configured to send (273) premium messages to the mobile phone (117) to collect funds for the repeated purchase.

In some embodiments, the purchases performed on the server (113) are generally repeatable with few exceptions; and the interchange (101) is configured to collect funds for the repeated purchase, prior to informing the server (113) of the repeated purchase via the payment notification (503) for the new payment.

In one embodiment, after a successful payment transaction is recorded in the data storage facility (107), the interchange (101) is configured to transmit a message to the mobile phone (117) announcing the success of the payment transaction. In one embodiment, the announcement includes an instruction for placing a repeated order via the interchange (101).

For example, in one embodiment, the announcement message includes a link to the interchange (101), which when selected on the mobile phone (117) causes the mobile phone (117) to transmit a message to the interchange (101) to request the interchange (101) to place a repeated purchase request on behalf of the user. In one embodiment, the link includes an identifier of the prior transaction; and thus, the purchase to be repeated does not have to be the purchase associated with the most recent transaction record (501).

For example, in one embodiment, the announcement message includes an instruction for the user to request the interchange (101) to place a repeated order on behalf of the user via replying to the announcement message, or via sending a message to a short code with an identifier of the successful payment transaction. When the identifier of the successful payment transaction is absent in the request (505) to repeat, the interchange (101) is to repeat the purchase associated with the latest transaction record (501).

In one embodiment, the interchange (101) provides a web portal that authenticates the user of the phone number (123) prior to allowing the user to view the transaction records (501) associated with the phone number (123). For a transaction record (501) displayed to the user via the web portal, an option is provided to allow the user to request the interchange (101) to repeat the purchase request on behalf of the user. Thus, the user experience to order what has been processed previously is greatly simplified.

In some embodiments, the merchants may also schedule or suggest purchases on behalf of the user of the phone number (123). When the merchants initiate the purchases on behalf of the user, the interchange (101) is to communicate with the mobile phone (117) to request confirmation (275) for the payment request. To avoid inadvertently spamming the mobile phone (117), the interchange (101) requests the authorization from the user to allow such merchant initiated requests.

Figure 28:
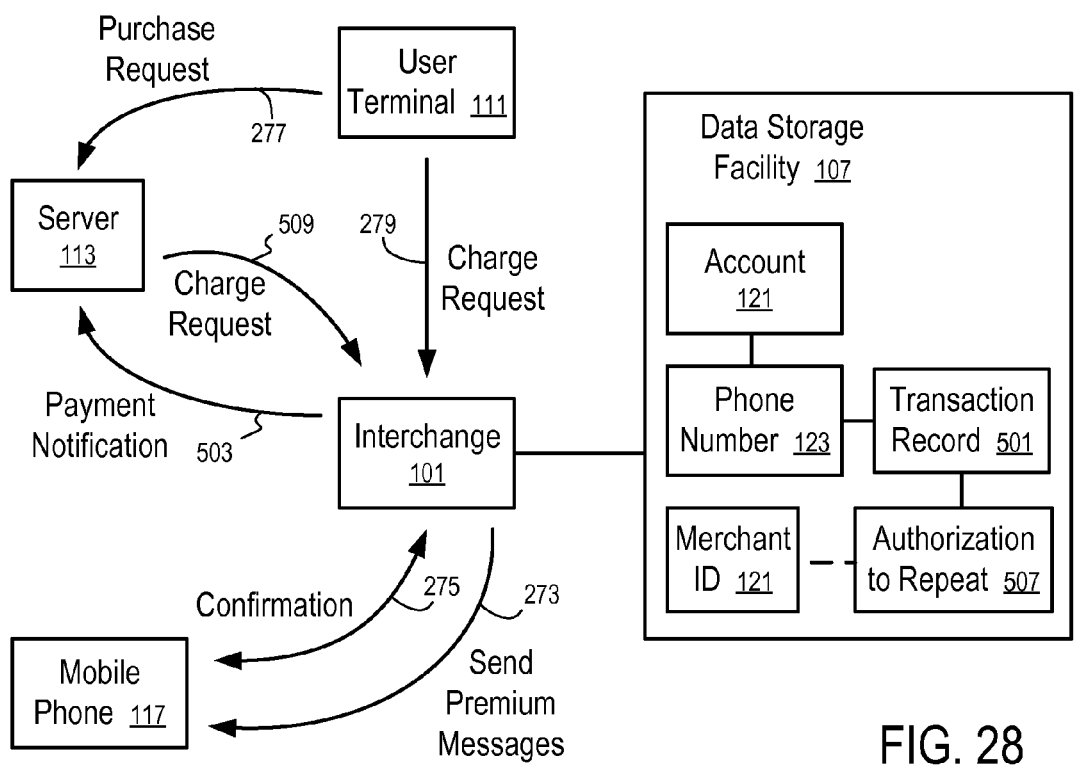
FIG. 28 shows a method to process a repeated transaction in response to a merchant request according to one embodiment.

FIG. 28 shows a method to process a repeated transaction in response to a merchant request according to one embodiment. In FIG. 28, after the user submits the purchase request (277) to the server (113) of the merchant, the server (113) is to forward the web browser running in the user terminal (111) to a web server of the interchange (101). The web server of the interchange (101) provides a user interface on the user terminal (111) to receive the charge request (279) corresponding to the purchase request (277).

In one embodiment, the user interface includes an option to allow the merchant to initiate the repeat of the purchase on behalf the user. When the option is selected by the user, the indication of authorization to repeat (507) is stored in the data storage facility (107) for the transaction record (501).

After the payment transaction associated with the transaction record (501) is completed successfully (via the confirmation (275) and sending (273) premium messages to the mobile phone (117)), the interchange (101) provides a payment notification (503) to the server (113). In one embodiment, the payment notification (503) is configured to indicate whether the merchant is authorized to repeat the transaction on behalf of the user, in accordance with the authorization to repeat (507).

When the server (113) transmits a charge request (509) for a repeated purchase, the interchange (101) is to determine whether the corresponding transaction record (501) is associated with the authorization to repeat (507); and if not, the charge request (509) is rejected.

If the charge request (509) from the server (113) for a repeated purchase has an authorization to repeat (507) associated with the corresponding transaction record (501), the interchange (101) is configured to communicate with the mobile phone (117) for the confirmation (275) of the new payment for the repeated purchase.

In FIGS. 27 and 28, the interchange (101) is configured to send (273) premium messages to the mobile phone (117) addressed using the phone number (123) to collect funds for the respective payments. Alternatively or in combination, the funds collected in the account (121) can be debited for the payment. In some embodiments, the account information (122) (e.g., credit accounts, debit accounts, payment intermediary accounts) associated with the phone number (123) in the data storage facility (107) can be to collect funds for the respective payments and/or the account (121).

In one embodiment, the authorization to repeat (507) is associated with the transaction record (501) to allow the merchant to repeat the specific purchase identified by the transaction record, but not other purchases.

In one embodiment, the authorization to repeat (507) is associated with the merchant ID (121) to allow the server (113) of the merchant to initiate a charge request (509) on behalf of the user. The merchant initiated charge request (509) is not necessarily for the repeat of a purchase identical to the prior purchase. The merchant initiated charge request (509) may be associated with a purchase with modifications made based on the prior purchase. In some embodiments, the merchant initiated charge request (509) is for a new purchase independent from the prior purchase during which the authorization to repeat (507) was received. In one embodiment, the authorization to repeat (507) allows the server (113) of the merchant to initiate a new purchase, such as a new product, a discount for the new purchase, a suggested or recommended purchase, etc; and the process to obtain the confirmation (275) via the communication with the mobile phone (117) allows the user to decide whether or not to accept the new purchase offer.

Figure 29:
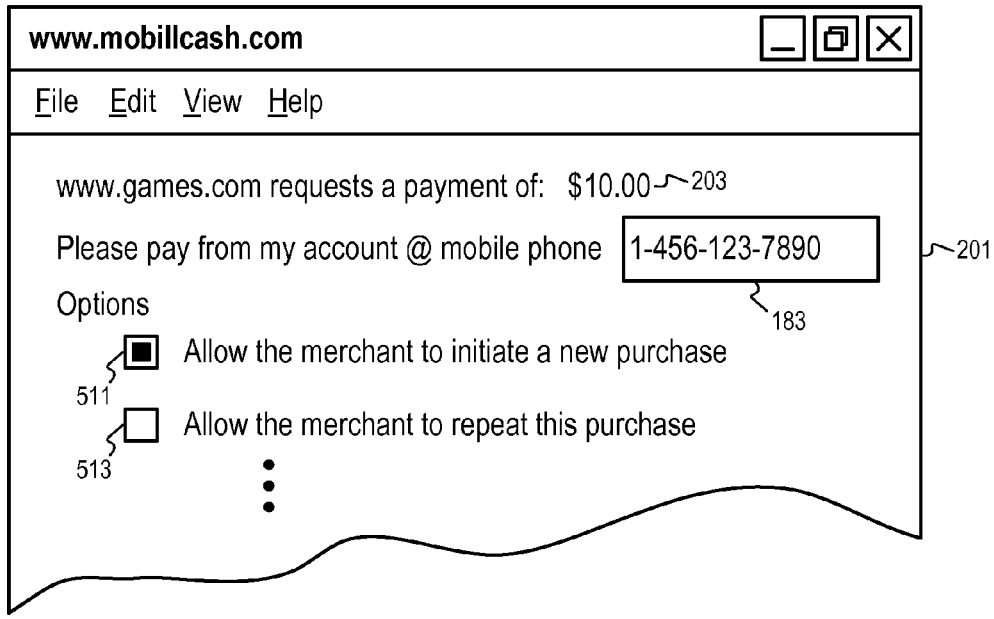
FIG. 29 shows a user interface to receive authorization for a merchant to initiate a payment request according to one embodiment.

FIG. 29 shows a user interface to receive authorization for a merchant to initiate a payment request according to one embodiment. In FIG. 29, the user interface (201) is provided by the interchange (101) to receive the charge request (279) for a purchase from the server (113) of the merchant. The user interface (201) uses the entry box (183) to receive the phone number (123) of the user to identify the funding source for the charge request (279).

In FIG. 29, the user interface (201) further includes options (511, 513, . . . ) to provide the authorization to repeat (507). For example, if the user selects the option (511), the interchange (101) is configured in one embodiment to notify the server (113) of the merchant that the user has authorized the merchant to initiate new purchases. Thus, when the merchant determines an opportunity to recommend a new purchase for the user, the server (113) can directly initiate a charge request (509), without having to first receive an explicit purchase request (277) from the user for the new purchase. Since the user has authorized the merchant to initiate a new purchase (e.g., via the selection of the option (511) in the user interface (201)), the interchange (101) is configured to process the charge request (509), including communicating with the mobile phone (117) at the phone number (123) for the confirmation (275) of the charge request (509).

In FIG. 29, if the user selects the option (511), the interchange (101) is configured in one embodiment to notify the server (113) of the merchant that the user has authorized the merchant to repeat the particular purchase for which the current payment transaction is being processed via the user interface (201), and store the authorization to repeat (507) in association with the current payment transaction. The authorization is limited to the repeat of the particular purchase; and the authorization to repeat (507) does not apply if the server (113) of the merchant initiates a different purchase. For example, the merchant initiated charge request (509) includes in one embodiment details about the purchase; and when the details of the purchase do not match with the transaction record (501) of the current purchase during the processing of which the option (513) is selected, the authorization to repeat (507) does not apply. In one embodiment, when no authorization data matches a merchant initiated charge request (509), the interchange (101) denies the charge request (509).

In one embodiment, the user interface (201) further presents other options, such as an option to allow the merchant to repeat any prior purchases for which payments have been successfully processed via the interchange (101) using funds associated with the phone number (123), an option to withdraw prior authorizations to allow the merchant to initiate a purchase, etc.

In one embodiment, the interchange (101) is configured to obtain the authorization to repeat (507) via the communication with the mobile phone (117) for the confirmation (275) of the payment transaction identified by the transaction record (501). For example, in response to a message from the interchange (101), the user may use the mobile phone (117) to transmit a message to provide the confirmation (275) of the charge request (279) associated with the transaction record (501) and an indication of the authorization to repeat (507) the purchase associated with the transaction record (501).

In one embodiment, the interchange (101) provides a web portal or a mobile application server that allows the user to use the user terminal (111) or the mobile phone (117) to view the transaction record (501) and selectively provide the authorization to repeat (507) for the transaction record (501) (or for the merchant represented by merchant ID (121)).

In one embodiment, after the premium messages (273) have been successfully sent to the mobile phone (117) to collect funds for the charge request (279) associated with the transaction record (501), the interchange (101) is configured to send a message to the mobile phone (117) indicating the success status of the payment transaction, provide instructions on how to request the interchange (101) to request a repeat of the purchase associated with the transaction record (501) on behalf of the user, and provide instructions on how to authorize the merchant to repeat the purchase on behalf of the user. For example, in one embodiment, the success notification message may instruct the user to reply with a first keyword to allow the merchant to initiate the charge request for a repeat of the purchase associated with the transaction record (501), or reply with a second keyword to allow the interchange (101) to communicate with the merchant (113) to repeat the purchase associated with the transaction record (501).

Figure 30:
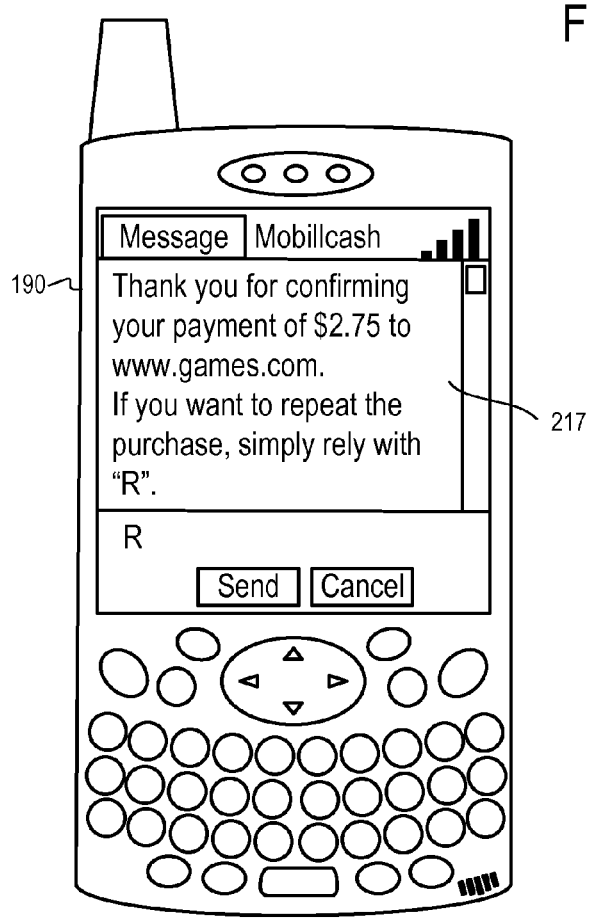
FIG. 30 illustrates mobile messages to facilitate the request for a repeated transaction according to one embodiment.

FIG. 30 illustrates mobile messages to facilitate the request for a repeated transaction according to one embodiment. In one embodiment, after the user receives the confirmation message (217) in the mobile phone (117) at the phone number (123), the user may reply to the confirmation message (217) with the keyword (e.g., "R") identified in the message (217) to request the interchange (101) to repeat the purchase on behalf of the user.

In one embodiment, the phone number which the interchange (101) used to transmit the confirmation message (217) to the user is used to identify the purchase. Different numbers are used to represent different purchases of the user. In one embodiment, a predetermined number of phone numbers of the interchange (101) are used to represent the respective number of most recent purchases of the user. Thus, the user can reply to the predetermined number of most recent confirmation messages (e.g., 217) to repeat the respective orders by simply replying to the respective confirmation message, without having to input additional information to identify the transactions.

In one embodiment, the interchange (101) uses only one phone number to receive the request (505) to repeat; and the purchase associated with the most recent transaction record (501) associated with the phone number (123) is the purchase to be repeated.

In one embodiment, the confirmation message (217) further includes an identifier of the transaction record (501) that can be used in a request (505) to repeat to explicitly identify the purchase.

In one embodiment, the mobile phone (117) is configured to display a list of transaction records (501) associated with the phone number (123) (e.g., via a mobile application, via an SMS portal that receives SMS queries and provides SMS replies); and the user is allowed to select a record from the list to request the interchange (101) to repeat the purchase on behalf of the user, using the funds associated with the phone number (123).

Figure 31:
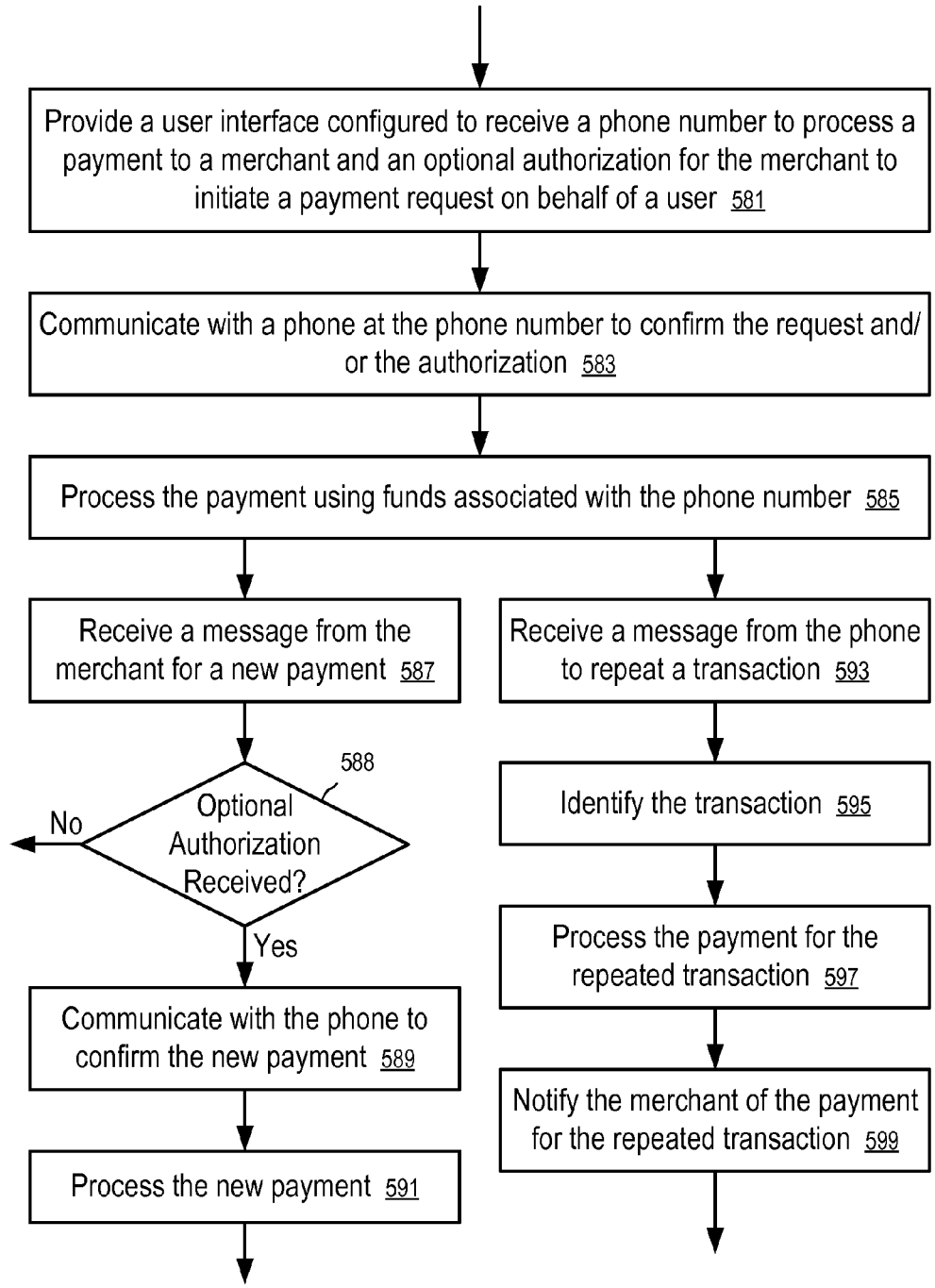
FIG. 31 illustrates a method to process repeated transactions according to one embodiment.

FIG. 31 illustrates a method to process repeated transactions according to one embodiment. In FIG. 31, the interchange (101) is configured to provide (581) a user interface (201) configured to receive a phone number (123) (e.g., using the text entry box (183)) to process a payment to a merchant and an optional authorization (511) for the merchant to initiate a payment request on behalf of a user of the phone number (123). Responsive to a charge request (279) received via the user interface (201), the interchange (101) is configured in one embodiment, to communicate (583) with a phone at the phone number (123) to confirm (275) the request and/or the authorization (507). After the confirmation (275) of the charge request (279) received from the user terminal (111) of the user, the interchange (101) is configured to process (585) the payment using funds associated with the phone number (123), such as funds collected via sending (273) premium messages to the mobile phone (117), funds in a stored value account (121) associated with the phone number (123), and/ or funds collected via charging one or more bank accounts of the user (e.g., credit card account, debit card account, prepaid card account, savings account, checking account).

After the transaction record (501) of the successful payment transaction is stored in the data storage facility (107) of the interchange (101), the interchange (101) may receive (587) a message from the merchant for a new payment (e.g., 509). In response, the interchange (101) is configured to determine (588) whether an optional authorization (507) has been previously received for the new payment request received from the merchant; if so, the interchange (101) is configured to communicate (589) with the mobile phone (117) at the phone number (123) to confirm the new payment and then process (591) the new payment.

In one embodiment, if no applicable authorization (507) has been previously received for the request for a new payment (e.g., 509), the interchange (101) is configured to communicate with the server (113) to request the server (113) to transmit the request via a user terminal (111).

In one embodiment, to prevent inadvertently spamming the user, a user is provided with an option to be authenticated on the user terminal (111) (e.g., via a password, a PIN, a browser cookie, a hardware/network identification number) prior to the interchange (101) initiating the communication with the mobile phone (117) for the confirmation (275) of a charge request.

For example, after the phone number (123) is used in a successful payment transaction, the interchange (101) may provide a message to the mobile phone (117) to indicate that the user wants to limit the interchange (101) initiated communication with the mobile phone (117) at the phone number (123), via a password, a PIN, a cookie identifier associated with the user terminal (111), or a hardware/network identification number, such as a Media Access Control (MAC) address or Internet Protocol (IP) address.

For example, in response to the success notification message, the user may transmit a user selected password or PIN to the interchange (101). The user selected password or PIN is stored in the data storage facility (107) with the phone number (123). To subsequently initiate a successful charge request against the phone number (123) via the user terminal (111), the interchange (101) is to authenticate the user of the user terminal (111) via the password or PIN associated with the phone number (123).

In one embodiment, the interchange (101) is configured to place a browser cookie in the user terminal (111), and store the browser cookie identifier and/or the hardware/network identification number of the user terminal (111) in association with the phone number (123) after the user terminal (111) has been authenticated for using the phone number (123). Subsequently, charge requests (e.g., 279) are authenticated via the browser cookie identifier and/or the hardware/network identification number stored in the data storage facility (107) in association with the phone number (123).

In one embodiment, to authenticate a user terminal (111), the interchange (101) is configured to transmit a one time password to the user terminal (111) and requests the user of the user terminal (111) to transmit the one time password from the mobile phone (117).

In FIG. 31, after the successful payment transaction (585), the interchange (101) may receive (593) a message from the mobile phone (117) having the phone number (123) to repeat a transaction. In response, the interchange (101) is configured in one embodiment to identify (595) the transaction, process (597) the payment for the repeated transaction, and notify (599) the merchant of the payment for the repeated transaction. Thus, the interchange (101) not only processes the payment for the repeated transaction, but also places the order for the repeated purchase with the merchant on behalf of the user.

In one embodiment, a most recent payment transaction associated with the phone number (123) is identified (595) as the previous payment transaction; and the interchange (101) communicates with the server (113) of the merchant to repeat the purchase associated with the previous payment transaction.

In one embodiment, the previous payment transaction is identified based on the message, such as a phone number at which the interchange (101) receives (593) the message, or an identifier of the previous payment transaction previously provided by the interchange (101) to the mobile phone (117) (e.g., in a message to request a prior payment, or a message to notify the user of the successful processing of the prior payment).

For example, in one embodiment, the message received (593) is a reply to a previous message transmitted from the interchange (101) to the mobile phone (117) in connection with the previous payment transaction identified by the transaction record (501); and the transaction record (501) is identified based at least in part on the phone number via which the previous message was sent. In one embodiment, the message received (593) from the mobile phone (117) is received via a short message service (SMS).

In one embodiment, the previous message transmitted from the interchange (101) to the mobile phone (117) having the phone number (123) includes a code to identify the previous payment transaction; and the message received (593) from the mobile phone (117) to repeat the transaction is configured to include the code. For example, the code may be embedded in a link to the interchange (101), which when selected causes a web browser running on the mobile phone (117) to transmit a web request to the interchange (101) to make the request (505) to repeat. Alternatively, the user may type the code in a text message transmitted to the interchange (101) to identify the previous transaction.

In one embodiment, when the interchange (101) receives a charge request (279) for the previous purchase, the interchange (101) is to communicate (583) with the mobile phone (117) at the phone number (123) to request confirmation (275) of a charge request (279) for the previous payment transaction. After the previous payment transaction is processed successfully, the payment to repeat the purchase can be processed without the interchange (101) communicating with the mobile phone (117) to request confirmation (275).

In one embodiment, a computing apparatus/system to facilitate repeated purchases includes a data storage facility (107) configured to store payment transaction records (e.g., 501) associated with phone numbers (e.g., 123). The payment transaction records include at least one record (501) for a successful prior payment transaction, where the record includes data (507) indicating a user selection of an option to authorize a respective merchant involved in the prior payment transaction to request payments on behalf of a user of a phone number (123) associated with the record (501).

In one embodiment, the computing apparatus/system further includes an interchange (101) coupled with the data storage facility (107). The interchange (101) includes a common format processor (133) and a plurality of converters (131) to interface with a plurality of controllers (115), where the converters (131) are configured to communicate with the controllers (115) in different formats, and to communicate with the common format processor (133) in a common format.

In one embodiment, in response to a message from the mobile phone (117) having the phone number (123), the common format processor (133) is configured to identify the record (501) of the prior payment transaction associated with the phone number (123) of the mobile phone (117), communicate with the merchant to repeat a purchase identified according to the prior payment transaction, and transmit via one of the converters (131) a plurality of premium messages to the mobile phone (117) to collect funds for a payment to repeat the purchase.

In one embodiment, in response to a payment request (509) from the merchant, the common format processor (133) is configured to determine whether to accept or reject the merchant initiated payment request (509) based at least in part on the data (507) indicating the user selection of the option for authorization to repeat.

Figure 32:
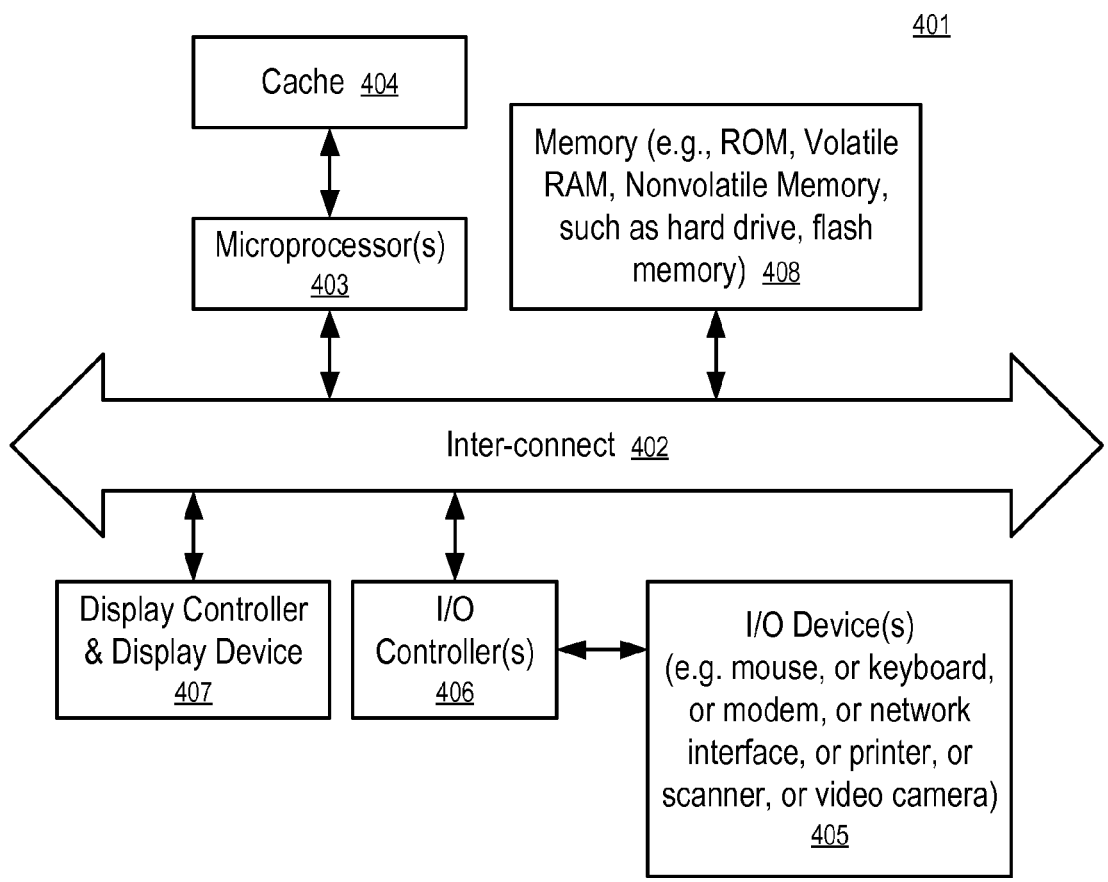
FIG. 32 shows a data processing system, which can be used in various embodiments.

FIG. 32 shows a data processing system, which can be used in various embodiments. While FIG. 32 illustrates various components of a computer system, it is not intended to represent any particular architecture or manner of interconnecting the components. Some embodiments may use other systems that have fewer or more components than those shown in FIG. 32.

In one embodiment, each of the interchange (101), the data storage facility (107), the controllers (115), the mobile phones (117), the user terminals (111) and the servers (113) can be implemented as a data processing system, with fewer or more components, as illustrated in FIG. 32.

In FIG. 32, the data processing system (401) includes an inter-connect (402) (e.g., bus and system core logic), which interconnects a microprocessor(s) (403) and memory (408). The microprocessor (403) is coupled to cache memory (404) in the example of FIG. 32.

The inter-connect (402) interconnects the microprocessor(s) (403) and the memory (408) together and also interconnects them to a display controller, display device (407), and to peripheral devices such as input/output (I/O) devices (405) through an input/output controller(s) (406).

Typical I/O devices include mice, keyboards, modems, network interfaces, printers, scanners, video cameras and other devices which are well known in the art. In some embodiments, when the data processing system is a server system, some of the I/O devices, such as printer, scanner, mice, and/or keyboards, are optional.

The inter-connect (402) may include one or more buses connected to one another through various bridges, controllers and/or adapters. In one embodiment, the I/O controller (406) includes a USB (Universal Serial Bus) adapter for controlling USB peripherals, and/or an IEEE-1394 bus adapter for controlling IEEE-1394 peripherals.

The memory (408) may include ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of tangible computer-readable storage media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any apparatus that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer-implemented method, comprising:
    processing, by a computing device, a previous payment transaction by a user of a phone number;
    receiving, by a computing device, an authorization from the user of the phone number, the authorization being associated with the previous payment and including an option to authorize a merchant to request a subsequent payment on behalf of the user;
    storing, by the computing device, the authorization data in association with the phone number to indicate a user selection of the option;
    receiving, by the computing device, a payment request from the merchant;
    determining, by the computing device, whether the authorization data is stored in association with the previous payment transaction;
    if the authorization data is not stored in association with the previous payment transaction, rejecting, by the computing device, the payment request; and
    if the authorization data is stored in association with the previous payment transaction, processing, by the computing device, the payment request.

2. The method of claim 1, wherein the authorization data is configured to allow the merchant to request a payment to repeat a purchase.

3. The method of claim 2, wherein the authorization data is configured to further allow the merchant to request a payment for a purchase different from the purchase associated with the previous payment transaction.

4. The method of claim 3, wherein the authorization data is stored in association with the previous payment transaction.

5. The method of claim 1, further comprising:
    receiving, by the computing device, a payment request from the merchant to repeat the purchase;
    communicating, by the computing device, with the mobile phone to request confirmation of the payment request received from the merchant, if the authorization data is stored in association with the previous payment transaction.

6. The method of claim 5, wherein the payment request does not go through a device of the user between being transmitted by the merchant and being received by the computing device.

7. The method of claim 1, further comprising:
    receiving, in the computing device, a message from a mobile phone having a phone number;
    identifying, by the computing device in response to the message, a previous payment transaction processed by the computing device for the phone number;
    communicating, by the computing device, with a merchant to repeat a purchase identified according to the previous payment transaction; and
    processing, by the computing device, a payment to the merchant using funds associated with the phone number to repeat the purchase.

8. The method of claim 7, wherein the identifying of the previous payment transaction comprises identifying a most recent payment transaction associated with the phone number as the previous payment transaction.

9. The method of claim 7, wherein the previous payment transaction is identified based on the message.

10. The method of claim 7, wherein the message is a reply to a previous message transmitted from the computing device to the mobile phone in connection with the previous payment transaction.

11. The method of claim 10, wherein the message received from the mobile phone is received via a short message service (SMS).

12. The method of claim 11, wherein the previous message transmitted from the computing device to the mobile phone includes a code to identify the previous payment transaction.

13. The method of claim 12, wherein the message received from the mobile phone includes the code to identify the previous payment transaction.

14. The method of claim 7, further comprising:
    communicating, by the computing device, with the mobile phone to request confirmation of a request for the previous payment transaction; and
    wherein the payment to repeat the purchase is processed without the computing device communicating with the mobile phone to request confirmation.

* * * * *